(12) United States Patent
Lewis

(10) Patent No.: US 6,199,905 B1
(45) Date of Patent: Mar. 13, 2001

(54) HIGH THERMAL EFFICIENCY INFLATOR AND PASSIVE RESTRAINTS INCORPORATING SAME

(75) Inventor: Donald J. Lewis, Scottsdale, AZ (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 0 days.

(21) Appl. No.: 09/444,730

(22) Filed: Nov. 18, 1999

Related U.S. Application Data

(63) Continuation-in-part of application No. 08/587,773, filed on Dec. 22, 1995, now Pat. No. 6,142,511.

(51) Int. Cl.[7] .................................................... B60R 21/26
(52) U.S. Cl. ............................ 280/737; 280/741; 102/531
(58) Field of Search ..................................... 280/737, 741, 280/736, 740, 742, 733; 102/530, 531

(56) References Cited

U.S. PATENT DOCUMENTS

| | | | |
|---|---|---|---|
| 3,655,217 | * 4/1972 | Johnson ................................ | 280/737 |
| 3,723,205 | * 3/1973 | Scheffee ................................ | 280/741 |
| 3,837,671 | * 9/1974 | Hamilton ............................... | 280/733 |
| 3,874,694 | * 4/1975 | Stephenson ........................... | 280/737 |
| 3,951,428 | * 4/1976 | Sugiura et al. ....................... | 280/737 |
| 5,290,060 | * 3/1994 | Smith .................................... | 280/737 |
| 5,348,344 | * 9/1994 | Blumenthal et al. ................. | 280/737 |
| 5,589,141 | * 12/1996 | Sides et al. ........................... | 280/741 |

* cited by examiner

Primary Examiner—Peter English

(57) ABSTRACT

The present invention is directed to a high thermal efficiency inflator having a thermal efficiency of greater than about 90 percent, to passive restraint systems utilizing the high thermal efficiency inflator of the invention, and to a method of inflating inflatable objects. The high thermal efficiency inflator has a housing having an inner surface, and defining an interior volume. The housing contains a pressurized gas at a first pressure in the interior volume; and a pyrotechnic material for producing heat upon combustion. The pyrotechnic material has a burn rate that is accelerated at the first pressure, and is subjected to the first pressure of the pyrotechnic material within the housing. In addition, the pyrotechnic material is substantially free of thermal contact with the housing, and is stored within the interior volume of the housing at a distance from the inner surface of the housing. The pyrotechnic material is in thermal contact with an ignitor for initiating combustion of the pyrotechnic material upon receipt of an initiation signal. A seal maintains the pressurized gas at the first pressure within the interior volume, where the means will open when the gas attains a predetermined second, higher pressure upon heating of the pressurized gas by combustion of the pyrotechnic material to allow an inflation gas to pass from the housing. Because of the burning rate of the propellant, the pressure of the gas, and the distance between the pyrotechnic material and the housing, significant contact between the burning pyrotechnic material and the inner surface of the housing is substantially prevented, and may be further reduced by utilizing internal insulators and a frangible central charge holder. As a result, at least about 90 percent of the heat produced by the combustion is transferred to the inflation gas, and no more than about 10 percent of the heat is transferred to the housing, resulting in a thermal efficiency of the high thermal efficiency inflator of at least about 90 percent, and an increase in temperature of the housing of no more than about 20° C. during functioning of the high thermal efficiency inflator.

36 Claims, 8 Drawing Sheets

HIGH THERMAL EFFICIENCY INFLATOR AND PASSIVE RESTRAINTS INCORPORATING SAME

REFERENCE TO RELATED APPLICATIONS

This application is a continuation-in-part of U.S. application Ser. No. 08/587,773, filed Dec. 22, 1995 U.S. Pat. No. 6,142,511.

FIELD OF THE INVENTION

The present invention is directed to an inflator, to passive restraint systems incorporating the inflator, and to a method of inflating inflatable objects with the inflator of the invention. In particular, the invention is directed to an ultra high thermal efficiency inflator, i.e., a hybrid inflator in which over 90 percent, and, preferably, more than 95 percent, of the heat generated by the combustion of a pyrotechnic material in the inflator is transferred to a stored gas component of the inflation gas, without significantly heating of any parasitic elements of the inflator, such as the housing or internal components within the inflator, so that any increase in the temperature of the inflator housing or of associated restraint components is substantially reduced or, preferably, eliminated. As a result, the amount of pressurized gas and pyrotechnic material required to provide a given volume of gas at a given temperature and the total volume of the inflator is minimized.

BACKGROUND OF THE INVENTION

Occupant safety has been a major concern of vehicle manufacturers since the late 1960's due to consumer demand and government regulation. Safety devices required under government regulations on all new automobiles sold in the United States include seat belts, dual front air bags, a collapsible or crushable steering column, head restraints, and side door guard beams. In addition, a representative model of each vehicle sold must be crash tested to demonstrate that the occupants of the vehicle would survive a 30 mile per hour crash into a barrier, which is equivalent to crashing into a parked car at 60 mph.

When worn, seat belts typically provide a small amount of slack for comfort, and to allow for some movement by the vehicle occupant. Therefore, seat belts are generally equipped with a mechanical or pyrotechnic pretensioning device that takes up the slack in the event of a collision. In addition, the webbing material in a seat belt is designed to stretch under a load, such as that which is experienced in a collision. This stretching, combined with any slack not taken up by a pretensioning device, allows the occupant to move forward in a collision before being restrained by the belt. As a result, portions of the occupant's body can impact portions of the vehicle interior, which, correspondingly, may themselves be moving back towards the occupant due to the crushing forces imposed by the collision.

Typical seat belts are relatively narrow, and, as a result, cannot distribute the load resulting from a collision over a wide area of the occupant's body. As a result, the high load that results from the collision is imposed on only a small portion of the occupant's body, which can cause injuries. Moreover, such belts do not provide any control over the motion of the occupant's head and neck, which may be subjected to severe loads.

Air bags are intended to supplement seat belts, and to overcome the deficiencies of such belts. However, because air bags are stored in the dash or steering wheel, the bag must inflate rapidly to deploy in time to restrain the occupant, or an important portion of the space and time available to decelerate the occupant and prevent injury is lost.

Inflatable seat belts have been proposed as a means of overcoming the deficiencies of standard seat belts and air bags. In particular, inflatable seat belts are in contact with the occupant, and, thus, begin to restrain the occupant more quickly than air bags, pushing the occupant back into the seat, and decreasing the total load on the occupant during the collision. However, prior art inflatable seat belts have not been totally successful. Prior art inflatable seat belts often include a pair of inflatable sections, which are difficult to store without interfering with the entry into and exit out of the vehicle by an occupant, and which require large inflators, complicating the placement of the inflator in the vehicle. This difficulty in positioning the inflator requires the inflation gas to be passed through conduits in the vehicle, slowing the inflation time, increasing the amount of gas needed, and, thus, increasing the size of the inflator required.

While the relatively slow inflation rate of prior art inflators is acceptable for the deployment of a dash or steering wheel mounted air bag, inflatable seat belts must deploy in less than one fourth the time available for the air bag due to their proximity to the occupant's body, and, e.g., to provide protection in a side impact, as the vehicle occupant is far closer to the impact than in a frontal or rear-end collision. The proximity of the occupant to the interior of the vehicle in a side impact substantially reduces the time available for deployment of the inflatable belt.

The inflators used with prior art inflatable seat belts are typically pyrotechnic inflators of the type used in conventional steering wheel and dash mounted air bags, which rely solely on a pyrotechnic gas generating composition to produce the inflation gas. Typical prior art pyrotechnic inflators are relatively inefficient thermodynamically, as a large amount of the heat generated by the combustion of the pyrotechnic gas generating composition is transferred to the components of the inflator, rather than to the inflation gas, reducing the final volume and/or pressure of the inflation gas. As a result, such inflators require an excessive amount of pyrotechnic material, as well as insulation between the inflator and the inflatable fabric to keep from burning or weakening the fabric, resulting in an increase in inflator size and additional difficulties in packaging the belt and inflator.

Hybrid inflators, which produce an inflation gas from the combination of the release of a stored pressurized gas and the generation of gas from the combustion of a pyrotechnic gas generation composition, have been proposed as an alternative to pyrotechnic inflators. However, the thermodynamic efficiency of prior art hybrid inflators is also relatively low because a significant portion of the heat generated by the combustion of the pyrotechnic material is absorbed by components in the inflator, rather than by the inflation gas, resulting in size and packaging problems similar to those found in pyrotechnic inflators.

A variety of hybrid inflators are disclosed in the prior art for use with passive restraint systems. For example, U.S. Pat. No. 3,837,671 to Hamilton discloses a compact inflating means for inflating inflatable vehicle restraint systems, such as inflatable bands, i.e., seat belts. The inflating means is a hybrid inflator that comprises a source of pressurized gas and means to release the pressurized gas in response to an increase in pressure in the pressurized gas. The increase in pressure is obtained by heating the gas in a manner that does not require a pyrotechnic material to generate large quantities of gas, thereby avoiding the use of explosive materials that may be hazardous. Instead, a conventional ignition squib is used to heat the pressurized gas. The squib comprises a high resistance bridging wire and an ignitable or combustible composition that is contained within a suitable container, and is thus separated from the pressurized gas. Upon receipt of an electrical signal, the bridging wire is heated, igniting the composition, which burns within the container and releases heat to the pressurized gas without releasing a large amount of gaseous combustion products. However, a significant amount of the heat generated by the squib is absorbed by the container when the squib is ignited, reducing the thermal efficiency of the inflator means. As a result of the low thermal efficiency, a larger amount of gas must be stored in the inflator means than would otherwise be required if the amount of heat absorbed by the device was minimized, thus raising the thermal efficiency.

U.S. Pat. No. 3,655,217 to Johnson discloses a hybrid inflator as a pressure source for inflatable safety devices. The pressure source includes a generally cylindrical member having an outlet member that is sealed with a rupturable disk welded to one end and a housing welded to the other end to provide a closed chamber for storage of a fluid under pressure, such as air, which is typically stored at a pressure of about 815 psi. A propellant is stored in a counter bore in the housing, and is separated from the pressurized fluid by a retainer cup. Upon receipt of an electrical signal, a conventional squib, mounted in the housing, ignites an ignition composition that, upon combustion, ruptures a closure member between the squib and the propellant, igniting the propellant. The propellant charge then burns, producing hot gas and pressure, which rupture a portion of the retainer cup, allowing the hot gas to flow into the pressurized fluid, heating the fluid, resulting in an increase in pressure of the fluid, bursting the rupturable disk at a pressure of about 1,250 psi, and allowing the pressurized fluid and hot gas to escape from the pressure source. The temperature of an air bag inflated with the disclosed pressure source is typically about 140° F. Because the propellant is stored and burned within a counter bore in the housing, a significant percentage of the released heat will be absorbed by the housing, thereby substantially lowering the thermal efficiency of the device.

U.S. Pat. No. 5,602,361 to Hamilton et al. discloses a hybrid inflator for an automotive inflatable safety system that utilizes both a pressurized gas and a gas generating propellant. The disclosed propellants are gun type propellants that generate large quantities of carbon monoxide and hydrogen gas when burned. These undesirable combustion products are eliminated from the inflation gas by including up to about 20 percent oxygen gas in the pressurized gas, so that the carbon monoxide and hydrogen are converted to carbon dioxide and water by reaction with the oxygen. The inflator includes a gas generator positioned within an inflator housing in which pressurized gas is stored at a pressure of about 3,000 psi. The gas generator contains propellant grains that are separated from the discharge end of the gas generator by a screen and a baffle, which, presumably, are intended to retain particulates within the gas generator during operation. The inflator operates by propelling a projectile through a closure disk to open a passageway between the inflator and an air bag. The projectile then impacts an actuation piston, firing at least one primer, igniting an ignition/booster charge, which, in turn ignites the propellant. As all of the components of the gas generator and the gas generator ignition assembly are contacted by at least one of the burning propellant or the hot combustion products, a large portion of the heat generated by the combustion of the propellant is absorbed by the components rather than being transferred to the inflation gas. As a result, the thermal efficiency of the inflator is low.

In prior art hybrid inflators, a significant amount of heat is absorbed by the mechanical components of the inflator, rather than the inflation gas. Therefore, to compensate for the heat lost to the inflator components, and to provide a given volume and pressure of inflation gas, the amount of inflation gas and/or pyrotechnic material and, thus, the size and weight of the inflator are greater than would be required if the thermal efficiency of the inflator was higher. Additionally, and potentially of greater importance, is the fact that the low efficiency of prior art inflators results in a significant heating of the inflator core and housing. As a result, following the operation of the inflator, the temperature of the inflator is sufficiently high to burn skin on contact, and to reduce the strength of the fabric of the inflatable. This is seriously limits the design of the restraint system. A small cool inflator would allow the system to be configured with the inflatable housed within the inflator, thereby greatly reducing cost, and improving system operations.

Therefore, a need exists for an inflator having a high thermal efficiency, which is, in turn, substantially smaller than prior art inflators, while still being capable of inflating an inflatable belt, side bag, or other inflatable restraint device in a time substantially shorter than that of prior art inflators without significantly increasing the temperature of the mechanical components of the inflator. The present invention is directed to such an inflator, as well as passive restraint systems incorporating the subject inflator.

SUMMARY OF THE INVENTION

The present invention is directed to a high thermal efficiency hybrid inflator having a thermal efficiency of over 90 percent, and, preferably, greater than 95 percent, to passive restraint systems utilizing the high thermal efficiency inflator of the invention, and to a method of inflating inflatable objects. In order to maximize that portion of the heat energy absorbed by the stored gas, absorption of heat energy by the mechanical components of the inflator is minimized. The high thermal efficiency inflator comprises a housing having an inner surface, and defining an interior volume. The housing contains a pressurized gas at a first pressure, typically, at least about 4,000 pounds per square inch ("psi"), preferably from about 5,000 to about 7,000 psi, most preferably about 6,000 psi, in the interior volume; and a pyrotechnic material for producing heat upon combustion. The pyrotechnic material has a burn rate that is accelerated at the first pressure in comparison to the burn rate at a pressure of 1 atmosphere, and is subjected to the first pressure of the pressurized gas within the housing. The time required for the pyrotechnic material to burn substantially completely is typically is on the order of about 950 microseconds ("$\mu s$"), but burn times in the range of about 200 microseconds to about 5 milliseconds (:ms") are useful. In addition, the pyrotechnic material is configured and positioned to be substantially free of thermal contact with the housing and all other components of the inflator other than the stored pressurized gas. Preferably, the pyrotechnic material is positioned within the interior volume near the center of the housing at a distance from the inner surface of the housing. The distance between the pyrotechnic material and the inner surface is determined, at least in part, by the burning rate of the pyrotechnic, so that, when the inflator functions, contact between the burning particles resulting from the combustion of the pyrotechnic material on the gas heated by their passage and the inner surface of the inflator is substantially reduced from conventional practice.

To obtain the high thermal efficiency of the inflator of the invention, the distance between the stored pyrotechnic material and the inner surface of the inflator, the time required for a granule or particle of pyrotechnic material to burn, the velocity of the granule or particle through the pressurized gas as it is propelled toward the inflator's inner wall by the locally higher pressure of the combustion zone, the pressure of the stored gas, and the drag of the stored gas charge on the burning granule or particle must all be balanced to minimize contact between hot combustion products of the burning pyrotechnic material and the mechanical components of the inflator. If these parameters are properly balanced, the granules or particles of pyrotechnic material, when ignited, are propelled through the stored pressurized gas, which is typically at a much lower temperature than the combustion products, more efficiently transferring the heat of combustion to the stored gas. The passage of the combustion products through the stored gas more effectively transfers the heat of combustion from the combustion products to the stored pressurized gas by conduction than would occur if the heating of the gas than would occur if the heat transfer was limited to convection and radiation. Moreover, when the pyrotechnic material is stored in a container, which is preferably frangible, the burning granules or particles will pass from the pyrotechnic charge holder with little or no heat loss to the container, as a result of the high pressure within the interior zone of the combusting propellant.

Preferably the pyrotechnic material is located at least about 0.25 inch, and, most preferably at least 0.5 inch, from the inner surface of the housing to substantially reduce contact of burning granules with the interior surface of the housing. As will be well understood by one of ordinary skill in the art, the distance required between the stored pyrotechnic material and the inner surface of the housing to prevent contact that would result in a transfer of heat to the housing will depend on the pressure of the gas within the housing and the type and amount of pyrotechnic material. For example, increasing the pressure of the gas with in the housing of the high efficiency inflator of the invention increases the drag on the burning granules, decreasing the distance they will travel. The pyrotechnic material is in thermal contact with an ignitor for initiating combustion of the pyrotechnic material upon receipt of an initiation signal. Preferably, the ignitor is a pyrotechnic squib, comprising a pair of connector pins electrically connected by a bridge wire, coated with or in thermal contact with a first firing compound, wherein the first firing compound is subjected to the pressure of the pressurized gas. The high thermal efficiency inflator further comprises means for maintaining the pressurized gas at the first pressure within the interior volume, where the means will open when the gas attains a predetermined second, higher pressure upon heating of the pressurized gas by combustion of the pyrotechnic material to allow an inflation gas to pass from the housing.

Typically, the pyrotechnic material is present in an amount sufficient to produce at least about 10 percent, preferably from about 10 to about 80 percent, and, most preferably, from about 40 to about 60 percent, of the inflation gas, and the pressurized gas is present in an amount sufficient to provide the balance of the inflation gas, i.e., up to about 90 mole percent, preferably from about 20 to about 90 mole percent, and most preferably, from about 40 up to about 60 mole percent of the inflation gas. In addition, the first pressure of the gas is sufficiently high to produce an aerodynamic drag on burning pyrotechnic material as they pass through the stored gas, thereby slowing the burning pyrotechnic materials, such that the drag produced on the burning pyrotechnic material and the distance between the stored pyrotechnic material and the inner surface of the housing are sufficiently great that contact between an appreciable amount of the burning pyrotechnic material, preferably, at least about 70 percent, and the inner surface of the housing is prevented to allow at least about 90 percent, preferably at least about 95 percent, of the heat produced by the combustion to be transferred to the inflation gas, so that no more than about 10 percent, and, preferably, no more than 5 percent, of the heat released is transferred to the housing, resulting in a thermal efficiency of the high thermal efficiency inflator of at least about 90 percent, preferably, at least about 95 percent, and, typically, an increase in temperature of the housing of no more than about 20° C. during functioning of the high thermal efficiency inflator.

The pyrotechnic material may be located within the housing in a thin frangible and/or combustible container that is preferably perforated. Upon combustion of the pyrotechnic material, the container ruptures or burns, thus allowing particles of burning pyrotechnic material to pass through the pressurized gas, transferring heat to progressive regions of cool gas within the interior volume of the inflator with high efficiency, thereby increasing the pressure of the gas. Combustible materials useful in forming the container include deep drawn steel, aluminum and a combination of palladium and aluminum. Additionally, the interior of the inflator may have at least one insulating layer to reduce heat transfer to the housing. Heat transfer to the housing may be further reduced by providing a smooth or, preferably, reflective surface on the interior of the housing to reflect radiant heat from the inflator wall and back to the stored gas that would otherwise heat the inflator housing.

In an alternate embodiment, which is somewhat less efficient than the embodiment described above that utilizes a frangible or combustible container for the pyrotechnic material, but still provides thermal efficiencies that are superior to prior art inflators, the pyrotechnic material is located within the housing in a container having one or more plugs formed from a frangible or combustible material, such that, upon combustion of the pyrotechnic material, the plugs rupture or burn, allowing particles of burning pyrotechnic material to exit the central housing, and pass through the gas, transferring heat to the gas. Preferably, the container further comprises apertures or pores that are of a sufficient size and a sufficient number to allow the pyrotechnical granules to complete combustion after leaving the container through the pores, thereby heating the pressurized gas.

Although the second pressure at which the means for maintaining the pressure of the gas opens is typically from about 7,000 to about 11,000 psi, preferably from about 8,000 to about 10,000 psi, most preferably about 9,000 psi, the peak operational pressure of the gas in the inflator may range from about 12,000 psi to about 20,000 psi, preferably from about 15,000 to about 17,000 psi, most preferably about 16,000 psi. However, local peak pressures in a small volume near the center or core of the high efficiency inflator may reach pressures as high as from about 45,000 to about 55,000 psi.

The high efficiency inflator operates well with any clean burning propellant. The preferred pyrotechnic material comprises an oxidizer of ammonium nitrate, guanidine nitrate, or nitroguanidine, an energizer, such as RDX, HMX, CL-20, TEX, NQ, NTO, TAGN, PETN, TATB, and TNAZ, and, optionally, a binder. More preferably the pyrotechnic material comprises ammonium nitrate, RDX, and a cellulose acetate binder. The most preferred pyrotechnic material comprises about 60 weight percent ammonium nitrate, about 36 weight percent RDX, and about 4 weight percent cellulose acetate binder, and has a burn rate of 20,000 m/s. The pyrotechnic material is in the form of a stick or sticks, a fine powder, flakes, granules, or other particles.

Preferably, the pressurized gas is a chemically inert gas having a low thermal conductivity of no more than about 250 W/cm·° C., preferably no more than about 200 W/cm·° C. at 25° C., such as argon, or a mixture of argon and helium, and the housing is formed from a material having a thermal conductivity at 25° C. of less than about 1 Watt/cm·° C., preferably less than about ½ Watt/cm·° C., or comprises an insulating layer of such a material on the inner housing of the housing, so that at least a portion of the housing is formed from at least one material such as a low thermal conductivity ceramic, epoxy, fiber glass, or nylon.

DETAILED DESCRIPTION OF THE INVENTION

Figure 1:
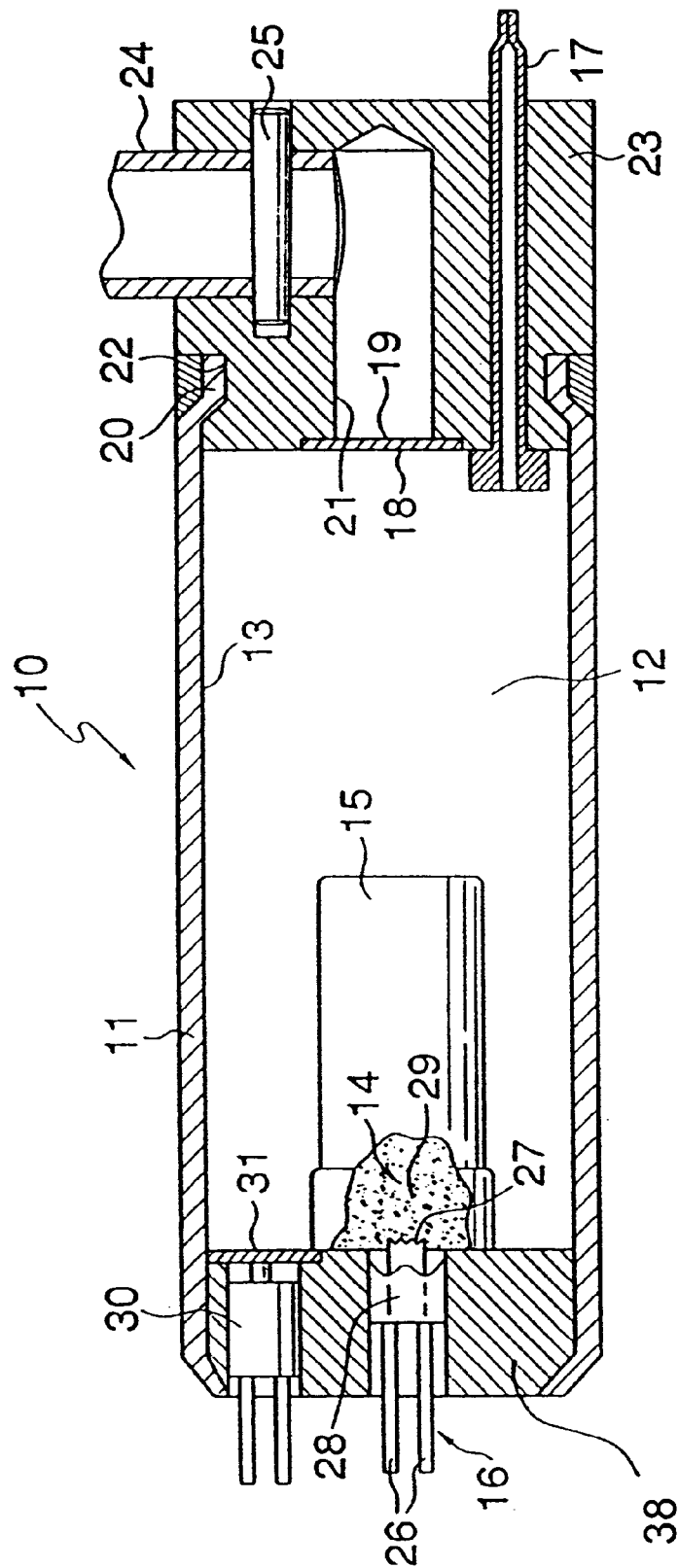
FIG. 1 is a sectional view of a first embodiment of the high thermal efficiency inflator of the invention.

As used herein, the term "hybrid inflator" refers to an inflator device that relies upon the combined effect of the release of a stored pressurized gas and the combustion of a pyrotechnic gas generating material within the pressurized gas to provide an inflation gas.

The term "high thermal efficiency inflator" refers to a hybrid inflator that is constructed in a manner that maximizes the transfer of heat energy to the inflation gas, so that at least 90 percent of the heat generated by the combustion of the pyrotechnic material used in the inflator is transferred to the pressurized gas and combustion products, such that, during operation, the increase in temperature of the housing or body of the inflator is substantially less than the increase in prior art inflators, and the amount of pressurized gas and pyrotechnic material necessary to provide a given volume of inflation gas at a given pressure is minimized.

As used herein, the term "thermal conductivity" refers to a proportionality constant that is related to the heat flow or time rate of heat transfer by conduction through a material as given in the equation $$\Delta Q/\Delta t = KA(T_2 - T_1)/1,$$

where $\Delta Q/\Delta t$ is the time rate of heat transfer, A is the cross sectional area across which the heat flows, $T_2 - T_1$ is the temperature differential across the material, 1 is the length across which the heat flows, and K is the proportionality constant that represents the thermal conductivity. Common units for K are Watts/cm·° C., Joules/s·cm·° C., and Cal/s·cm·° C. Also, as used herein, a "low thermal conductivity material" is any solid material having a thermal conductivity at 25° C. of less than about 1, preferably, less than about ½ Watts/cm·° C., and a "low thermal conductivity gas" is any gas having a thermal conductivity at 20° C. of less than about 250, preferably, less than about 200 Watts/cm·° C.

As also used herein, the term "thermal efficiency" refers to that portion of the total amount of heat produced by the combustion of the pyrotechnic material that is absorbed by the pressurized gas and retained by the gaseous combustion products. That is, the thermal efficiency is the ratio of the amount of heat transferred to, and retained by the inflation gas during the combustion of the pyrotechnic material to the total amount heat of released during combustion. The greater the portion of the heat generated that is transferred to and retained by the inflation gas, the higher the thermal efficiency of the inflator. By maximizing the thermal efficiency of the high thermal efficiency inflator of the invention, its size and weight can be minimized, because a smaller amount of pyrotechnic material is required, allowing the use of a lighter housing.

As also used herein, the term "chemically inert gas" refers to any gas that does not undergo a chemical reaction under the conditions of temperature and pressure within the inflator of the invention prior to or during the functioning of the inflator.

The present invention is directed to a high thermal efficiency inflator of the type generally illustrated in FIG. 1, to systems incorporating the high thermal efficiency inflator of the invention, and to a method of inflating inflatable objects utilizing the high thermal efficiency inflator of the invention. Although the high thermal efficiency inflator of the invention may be adapted for rapidly inflating virtually any inflatable object, including, but not limited to emergency rafts and escape chutes, the invention is particularly suited for inflating inflatable passive restraint devices, such as inflatable seat belts and front and side air bags. The high thermal efficiency inflator is a hybrid inflator, as disclosed in co-pending U.S. patent application Ser. No. 08/587,773, filed Dec. 23, 1995, the contents of which are incorporated herein to the extent necessary to supplement this specification.

As illustrated in FIG. 1, high thermal efficiency inflator 10 comprises a housing 11, having an inner surface 13, which defines an interior volume 12. Housing 11 is preferably formed from or lined with a low thermal conductivity material of a type well known in the art, such as, for example, a low thermal conductivity metal, ceramic, epoxy, fiber glass, nylon, or other suitable material having a low thermal conductivity and, most preferably, has a heat reflective inner surface. The interior volume 12 contains a highly pressurized chemically inert gas, having a low thermal conductivity, such as argon, which has a thermal conductivity of about 162 W/cm·° C. Typically, the gas is stored at a pressure of at least about 4,000 psi, preferably, from about 5,000 to about 7,000 psi, most preferably about 6,000 psi.

A pyrotechnic material 14, of any type known in the art capable of producing solely gaseous combustion products and heat, is located within the housing 11, preferably, in such a manner that the pyrotechnic material 14 is subjected to the pressure of the gas, and, more preferably, is exposed to the pressurized gas. The pyrotechnic material 14 may optionally be contained in a holder 15, which is preferably formed from a frangible or combustible material, and which may also define one or more apertures to permit passage therethrough of the compressed gas and/or gaseous combustion products. The pyrotechnic material 14 and/or the optional holder 15 should be mounted or supported by an insulating material having a very low thermal conductivity, and may form a part of the housing, such as end plug 38, as shown in FIG. 1. Combustion of the pyrotechnic material 14 is commenced by an ignitor, which may be of any type known in the art. Typically, the ignitor is a pyrotechnic squib 16 as shown in FIG. 1, but may also be a mechanical device, such as a firing pin. Where a pyrotechnic squib 16 is used as the ignitor, the squib is preferably also subjected to the pressure of the pressurized gas.

Pyrotechnic squibs and other useful ignitors for initiating combustion of pyrotechnic materials are well known in the art. Squib 16, as illustrated in FIG. 1, typically comprises a pair of connector pins 26 that extend through a plug 28 formed from an insulating material to prevent an electrical short circuit. As with all components of the high thermal efficiency inflator 10, plug 28 is preferably formed from a low thermal conductivity material, such as those discussed above for use in the housing. The connector pins 26 are connected electrically to a bridge wire 27 that is coated with or in thermal contact with a first firing compound 29, which is also is in thermal contact with the pyrotechnic material 14. Preferably, the first firing compound 29 is also exposed to the pressure of the pressurized gas. When operation of the high thermal efficiency inflator 10 is required, a voltage is applied across the connector pins 26, which produces a current in the bridge wire 27, heating the wire, and rapidly igniting the first firing compound 29, which, in turn, ignites the pyrotechnic material 14.

Figure 1A:
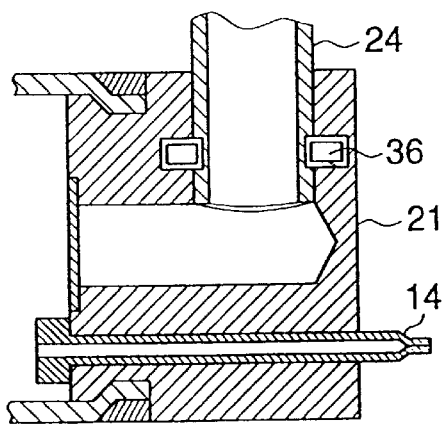
FIG. 1a is a fragmentary sectional view through the inflator of FIG. 1 illustrating one embodiment of a rotatable conduit for directing gasses from within the inflator housing to an inflatable member such as an inflatable belt.
Figure 1B:
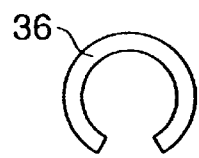
FIG. 1b is a plan view of a C-shaped snap ring adapted to permit rotation of the conduit.
Figure 1C:
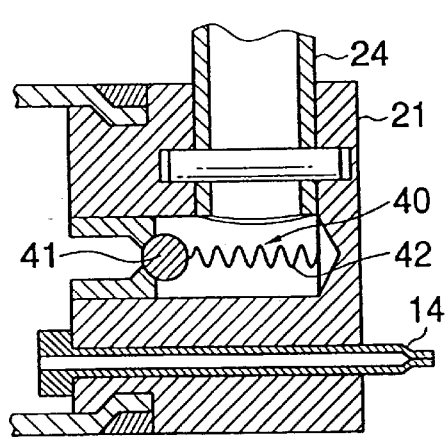
FIGS. 1c and 1d are fragmentary sectional views through the inflator of FIG. 1 illustrating one embodiment of a pop-off valve adapted for controlling passage of heated gasses in the closed and open positions, respectively.
Figure 1D:
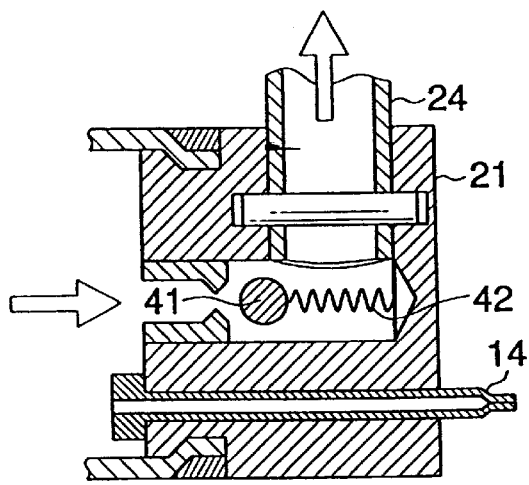
Figure 1E:
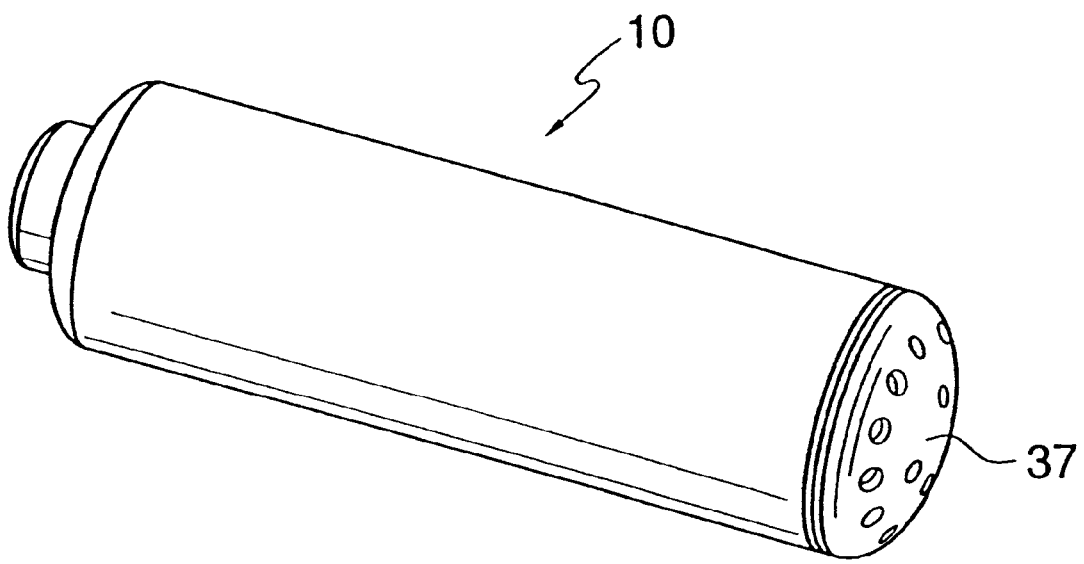
FIG. 1e is an external view of a high thermal efficiency inflator having an outlet gas diffuser.

The pressurized gas within interior volume 12 is typically introduced into interior volume 12 of housing 11 using any means known in the art for filling a container with a high pressure gas, such as through a fill port 17, which may comprise a hollow pin, and which may be sealed by any means known in the art, such as by welding, after the gas has been inserted into the housing. A seal 18 situated within or across an outlet aperture 19 maintains the pressure of the gas at a first pressure within the interior volume 12 of the housing 11, but opens when the gas attains a predetermined, second higher pressure upon combustion of the pyrotechnic material 14. The seal 18 may be a rupturable diaphragm, as shown in FIG. 1, a pop-off valve 40, as shown in FIGS. 1c and 1d, or any other openable sealing means known in the art. Pop-off valve 40 is typically a closure valve or ball 41 held in place over the outlet aperture 19 by pressure provided by a spring or pneumatic device 42, or any other device known in the art that will open rapidly at a predetermined pressure, and allow for the rapid release of the gas. Preferably, the seal 18 is a rupturable diaphragm, as shown in FIG. 1. The inflator 10 may also be equipped with an outlet gas diffuser 37 over the outlet aperture, as shown in FIG. 1e, to facilitate the release of the inflation gas into the object to be inflated.

As shown in FIG. 1, an optional insert 21, which may comprise a manifold 23, may be affixed to the housing 11 by any means known in the art that will maintain the pressurized gas within the housing 11, such as, e.g., by crimping the housing 11 to the manifold 23 at 20. Where the housing 11 is crimped, a ring 22, preferably formed from a flexible elastomer, may be disposed in the housing 11 adjacent the crimp 20 to provide a seal for preventing gas leakage from the housing. The housing 11, insert 21, and manifold 23 are typically formed from a material capable of maintaining the gas at the desired pressure, and which itself has a low thermal conductivity or which contains a coating on the interior surface formed from a material having a low thermal conductivity. That is housing 11, insert 21, and manifold 23 may be formed from or lined with a low thermal conductivity metal, ceramic, epoxy, fiber glass, nylon, or other suitable material having a low thermal conductivity, all of which are well known in the art.

Although the high thermal efficiency inflator 10 is sufficiently small to be positioned such that the outlet aperture 19 may be directly attached to the inlet of an inflatable object, such as an inflatable restraint, the interior volume 12 of housing 11 may also be placed in fluid communication with a conduit 24 attached to or part of manifold 23 for directing the inflation gas to the restraint or other inflatable member. Conduit 24 may be a pipe, tube, or other structural conduit that is preferably not distorted or collapsed during the operation of the inflator 10. Where the manifold 23 is present, the exit aperture 19 typically communicates with a conduit 24, extending from the manifold 23. The conduit 24 may be fixedly attached to the manifold 23 with, e.g., a pin 25 or other means known in the art. Alternatively, the conduit 24 may be rotatably affixed with, e.g., a snap ring or by other means known in the art to allow rotation about the axis of the exit aperture 19 or the conduit 24 to assist in providing the most desirable position for inflating an inflatable object, such as the inflatable belt 100, shown in FIGS. 5 and 6. Such a rotatable conduit is illustrated in FIG. 1a. As shown therein, rotation of conduit 24 is made possible in a manner well known in the art by snap ring 36, which at least partially surrounds a base portion of the conduit. One embodiment of such a snap ring is illustrated in FIG. 1b, although as indicated above the invention is not limited to use with snap rings. It will be appreciated that the conduit 24 may be omitted if the inflator is intended to communicate directly with the inflatable object.

Optionally, a switch 30, as shown in FIG. 1, is disposed in the housing 11, and associated with a diaphragm 31, which is pressed against the switch 30 by pressure of the stored gas in the housing 11 when the gas pressure is at or exceeds the minimum pressure required for the proper functioning of the inflator. Should the pressure of the gas in the housing 11 drop to a value less than that required for the proper functioning of the inflator, the diaphragm 31 becomes displaced from the switch 30, closing the switch 30, and completing an electrical circuit associated with a warning device, such as a light on the instrument panel or display panel (not shown) at the front of the passenger compartment in the vehicle, to indicate that the inflator 10 is not operative. The operation of the switch 30 may provide a signal to associated electronic circuitry. This signal provides an indication that the inflator 10 is in a defective state. Such associated circuitry is believed to be known to a person of ordinary skill in the art.

The pyrotechnic material 14 may be any pyrotechnic material known in the art having a rapid burn rate that is accelerated by the pressure of the gas within the housing 11. Preferably, the pyrotechnic material is a gas generating compound that is used in an amount sufficient to produce at least about 10 percent, preferably from about 10 to about 80 percent, and, most preferably, from about 40 to about 60 percent, of the inflation gas on combustion. The preferred pyrotechnic material is one that produces primarily gaseous byproducts. Typically, the preferred pyrotechnic material comprises at least one of ammonium nitrate, nitroguanidine, or guanidine nitrate as an oxidizer together with an energizer and, optionally, a binder. Useful energizers include, but are not limited to RDX, HMX, CL-20, TEX, NQ, NTO, TAGN, PETN, TATB, TNAZ, or mixtures thereof. The most preferred pyrotechnic material comprises about 60 weight percent ammonium nitrate, about 36 weight percent RDX, and about 4 weight percent cellulose acetate binder, has a burn rate of 20,000 m/s, and, on combustion, produces by-products and end products that do not require a filter in the high thermal efficiency inflator. The preferred pyrotechnic material may be in the form of stick or sticks, a fine powder, flakes, granules, or other particles with granules being preferred to provide control of peak inflator pressure by controlling the rate of ignition and combustion, with a granule size of about 1 mm (0.04 inch) to about 3 mm (0.12 inch) diameter proving ideal. Most preferably, the pyrotechnic material is in the form of granules that are lightly packed into a frangible or combustible holder. Although the following description typically refers to granules of the pyrotechnic material, the form of pyrotechnic material required for a particular application will be readily apparent to one of ordinary skill in the art in light of the present disclosure.

However, the burn rate of the entire volume of the pyrotechnic material will increase as the mechanical and thermal contact between granules increases, thereby reducing the overall burn time, by reducing the time for transfer of ignition one granule to the other. That is, as the particles or granules of the pyrotechnic material are more tightly compacted together, the time required for the complete combustion of all of the pyrotechnic material decreases.

As noted above, in the most preferred embodiment, the pyrotechnic material 14 is contained within the interior volume 12 of the housing 11 in an optional holder 15 in the form of lightly packed granules. Most preferably, holder 15 has a diameter of from about 6.3 mm (0.25 inch) to about 10.1 mm (0.4 inch), and is formed from a frangible or a combustible material that will rapidly rupture, burst, or burn upon the ignition of the pyrotechnic material. Preferably, the holder 15 is combustible, and releases, rather than absorbs, heat upon combustion. Examples of such combustible materials include pyrofoil, a combination of palladium and aluminum, or deep draw aluminum, which will burn with excess oxidizer. As will be readily appreciated, where the optional holder 15 is not used, the pyrotechnic material must be in a form that will hold its shape, such as an extruded stick, compressed granules, or particles of the material mixed with a binder, allowing the stored pyrotechnic material 14 to be properly positioned within the housing of the high thermal efficiency inflator.

The use of a holder formed from a frangible or combustible material allows the granular material, upon deflagration, to rapidly exit the holder, and to travel through substantially all of the gas, transferring heat to the gas adiabatically as the burning granules travel through and contact the cool gas. By allowing each burning particle to travel through cool gas, the heat transfer occurs throughout the gas, rather than being confined to a single point within the gas, as occurs when the pyrotechnic material is confined. This maximizes the heat transferred to the gas, and also minimizes any pressure or temperature gradient within the gas charge.

Moreover, when the granules of pyrotechnic material are loosely packed within a frangible or combustible holder, there is a delay between the initiation of combustion of the pyrotechnic granules nearest the ignitor and the initiation of combustion of the other pyrotechnic granules. Each of the granules that is not initially ignited by the ignitor is ignited at a later time by a previously ignited granule. This further minimizes the peak pressure and temperature within the gas. The more tightly packed the granules, the shorter the delay time between the initiation of combustion of the granules in thermal contact with the first firing compound of the ignitor and the combustion of the remaining granules. Where the pyrotechnic material is in the form of an extruded solid, the delay time is essentially zero, resulting in an extremely rapid release of inflation gas from the inflator.

Subjecting the pyrotechnic material to the high pressure of the gas within the interior volume of the housing has two effects on the pyrotechnic material. First, the high pressure increases the burn rate, so that individual granules burn in less than about 1 ms, and, preferably, no more than 0.5 ms. Second, the high pressure of the gas retards the movement of the granules by increasing the density of the gas and hence the aerodynamic drag on each particle, thereby slowing the movement of the burning particle through the gas. During combustion of the granules, substantially all of the granules are completely consumed as the granules pass through the gas in the housing. This results from the combination of the rapid burn rate and the drag of the gas on the granules, and substantially prevents contact of the burning granules of pyrotechnic material with the housing, thereby substantially reducing or, preferably, eliminating the transfer of heat energy to the housing. This provides the inflator of the invention with an extremely high thermal efficiency, such that at least 90 percent, and typically more than 95 percent, of the heat generated by the combustion of the pyrotechnic material is retained by combustion products or transferred to the pressurized gas.

In applications where the high thermal efficiency inflator will be subjected to physical or mechanical stress sufficient to rupture a frangible holder during periods of non-operation, other means must be provided to prevent the pyrotechnic material from being spilled into the interior volume in the housing, while maintaining the high thermal efficiency of the high thermal efficiency inflator. Because these alternative means of holding the pyrotechnic material tend to restrict the movement of the burning granules of pyrotechnic material upon ignition, they tend to confine the transfer of heat to only a portion of the gas, and absorb heat that would otherwise be transferred to the gas. As a result, during operation, the peak pressure and temperature within some of the gas charge within the high thermal efficiency inflator is increased, and there is a slight reduction in the pressure of the inflation gas and the thermal efficiency of the high thermal efficiency inflator in comparison to that of the most preferred embodiment, because of the uneven heating of the gas. That is, some of the gas is heated less than other portions of the gas. However, in any high thermal efficiency inflator in accordance with the invention, contact between the burning granules of pyrotechnic material and the housing and any other non-gaseous portions of the high thermal efficiency inflator is minimized, so that little or no heat is transferred to any part of the high thermal efficiency inflator other than the pressurized gas. As a result, the total amount of heat retained by the combustion products and transferred to the gas in a high thermal efficiency inflator of the invention is at least 95 percent, and, thus, no more than about 5 percent of the heat is transferred to the housing or other components of the high thermal efficiency inflator. As a result, the temperature increase of the inflator during operation is minimized, and the temperature of the housing increases by no more than about 10 to about 12° F. following initiation of the inflator.

Figure 2:
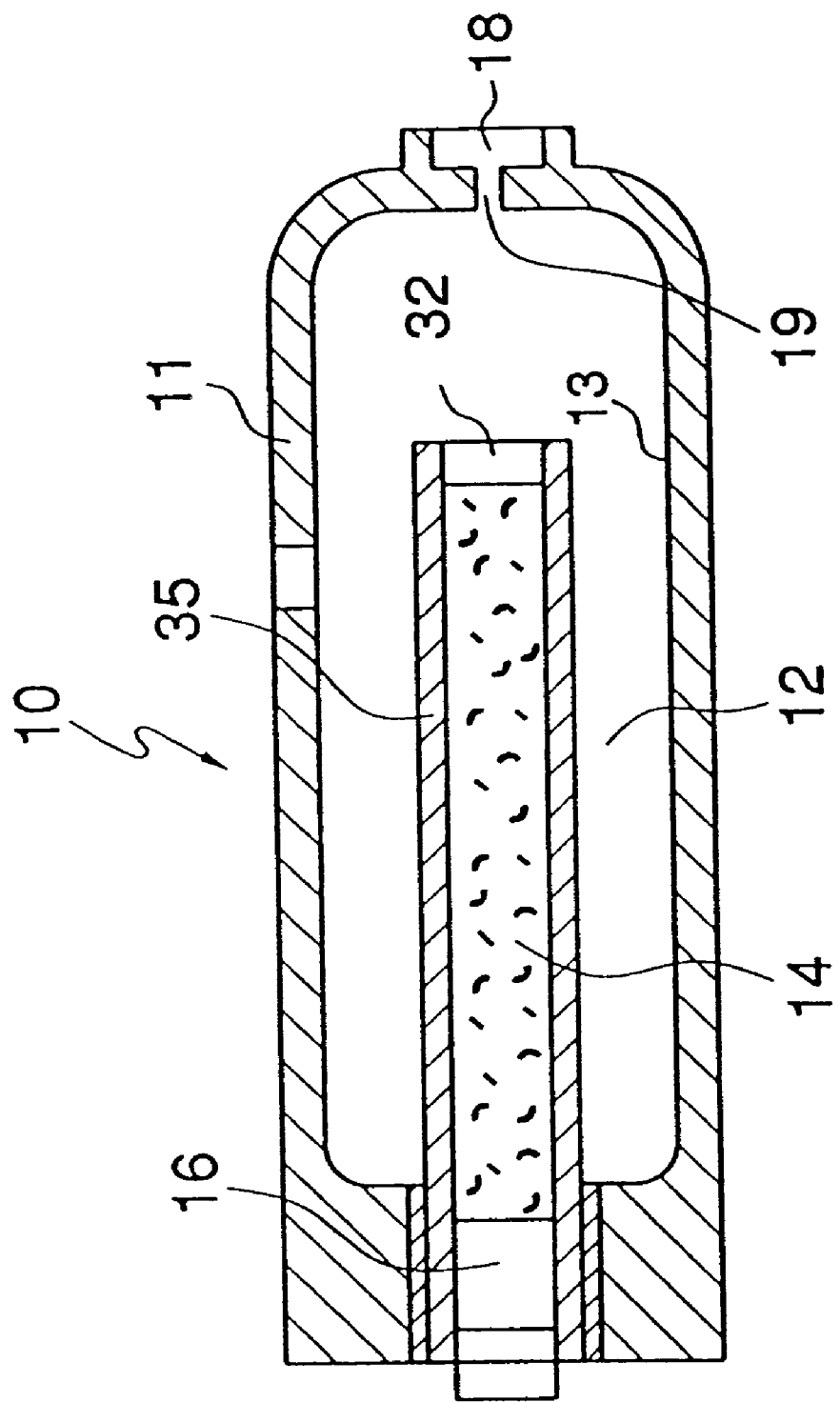
FIG. 2 is a sectional view of a second embodiment of the high thermal efficiency inflator of the invention.

In one embodiment, as shown in FIG. 2, the frangible holder 15, shown in FIG. 1, is replaced with a thin metal tubular holder 35, having a diameter of from about 0.6 inch (about 15 mm) to about 1 inch (about 25 mm), and which is preferably porous, having an end plug 32 formed from a frangible or combustible material. Upon initiation of combustion of the pyrotechnic material 14 within the tubular holder 35, the end plug 32 burns or breaks open, allowing the granules of the pyrotechnic material 14 to travel longitudinally down the length of the interior volume 12 within the housing 11. The granules of pyrotechnic material are thus propelled through the pressurized gas due to the ignition of the pyrotechnic material 14 by the ignitor 16, and, because of the high burn rate and the high pressure of the gas, substantially all of the granules are completely consumed before reaching the inner surface 13 of the housing 11, ensuring that little heat is transferred to housing 11.

As with the embodiment illustrated in FIG. 1 in which a frangible holder is used, there is a delay in the ignition of the granules of pyrotechnic material 14 most distant from the ignition source following initiation. As a result, although each particle burns in no more than about 0.5 ms, the total burn time for the pyrotechnic material is typically from about 2 to about 5 ms. This provides maximum contact between the burning granules and the cool gas, so that peak pressure and temperature, as well as the temperature and pressure gradients within the gas are minimized.

Figure 3:
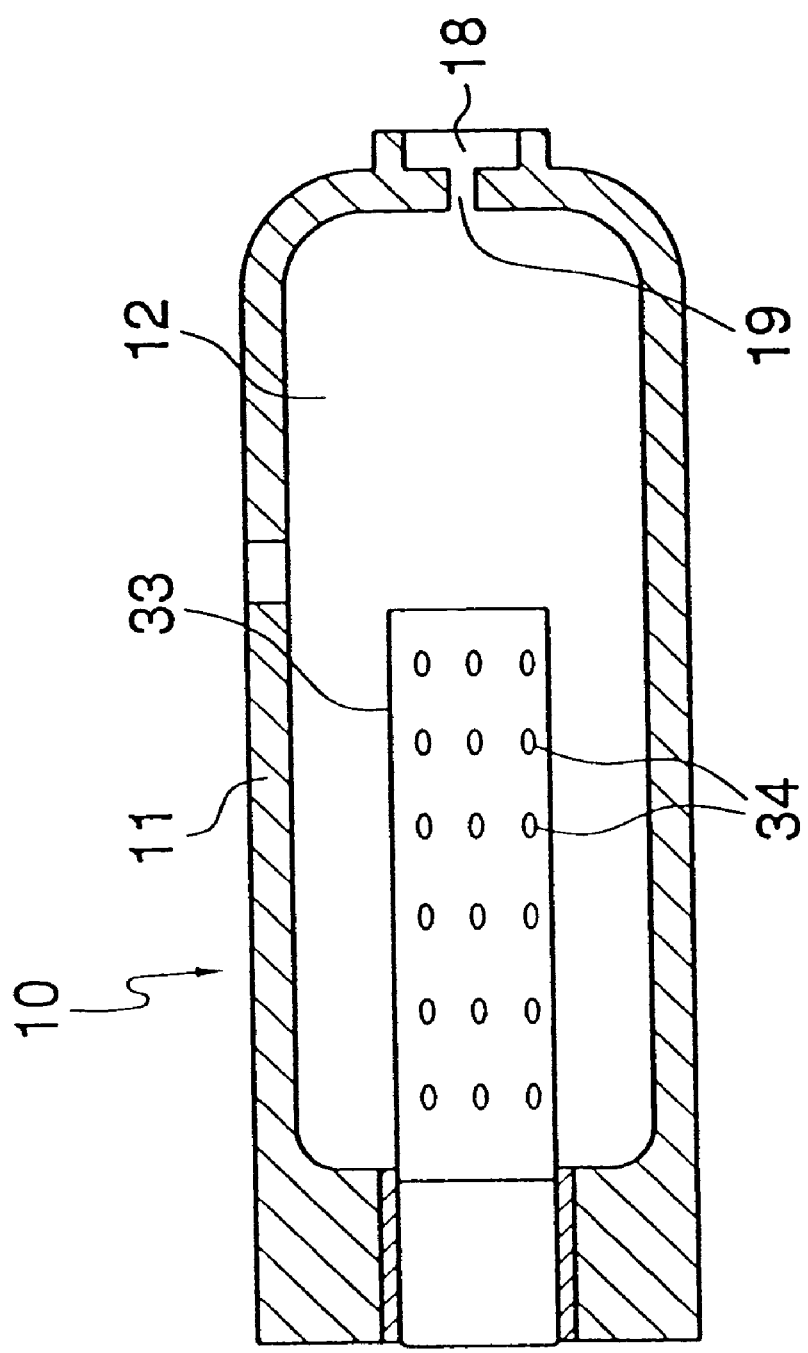
FIG. 3 is a sectional view of a third embodiment of the high thermal efficiency inflator of the invention.

In a further embodiment, as shown in FIG. 3, the pyrotechnic material (not shown) is contained in a porous holder 33, made from a thin material, typically a metal, having a very low heat capacity, i.e., the amount of heat absorbed by the holder during the operation of the inflator is no more than about 3 percent, and, preferably, no more than about 1 percent of the heat generated by the combustion of the pyrotechnic material, so that the holder 33 absorbs a minimum amount of heat during the combustion of the pyrotechnic material, and can rapidly transfer any absorbed heat to the pressurized gas. Preferably, the pyrotechnic material is in the form of loosely packed granules, and the pores 34 in the holder 33 are slightly smaller than the granules of pyrotechnic material 14. When the pores 34 are of the appropriate size, the granules of pyrotechnic material, which decrease in size during combustion, can exit the holder 33 with the gaseous combustion products produced by the pyrotechnic material, and travel through the cool gas, heating the gas and raising the pressure. Again, substantially all of the granules of the pyrotechnic material are completely consumed before reaching the inner surface of the housing.

The thermal efficiency of a high thermal efficiency inflator using such a porous holder 33 may be lower than that of the embodiments described above. The amount of heat absorbed by the holder 33, rather than being transferred to the gas, will typically be greater than that absorbed by the frangible or combustible holder 15, because the holder 33 typically has a greater mass, i.e., the holder 33 contains more material, and, thus, can absorb a greater amount of heat. As a result, less of the heat energy from the combustion is available for increasing the gas pressure, and the thermal efficiency decreases. However, the thermal efficiency of a high thermal efficiency inflator using a porous holder 33 is still at least about 90 percent, which is far superior to that of prior art inflators In addition, because the movement of granules through the gas is decreased, larger pressure and temperature gradients are produced, resulting in locally higher peak pressure and temperature. This creates a shock wave in the pressurized gas that cause the seal to open early, rapidly releasing the gas from the high thermal efficiency inflator. Although it might be expected that this would provide a higher final pressure when an object is inflated with the high thermal efficiency inflator, the final inflation pressure is actually lower. Therefore, if the pores in the holder are sufficiently small that virtually none of the burning granules escape, the high thermal efficiency inflator can have an extremely high local peak pressure, i.e., on the order of 50 to 60 kpsi, and a lower inflation pressure is produced than can be obtained with more preferred embodiments, as described above.

Figure 4:
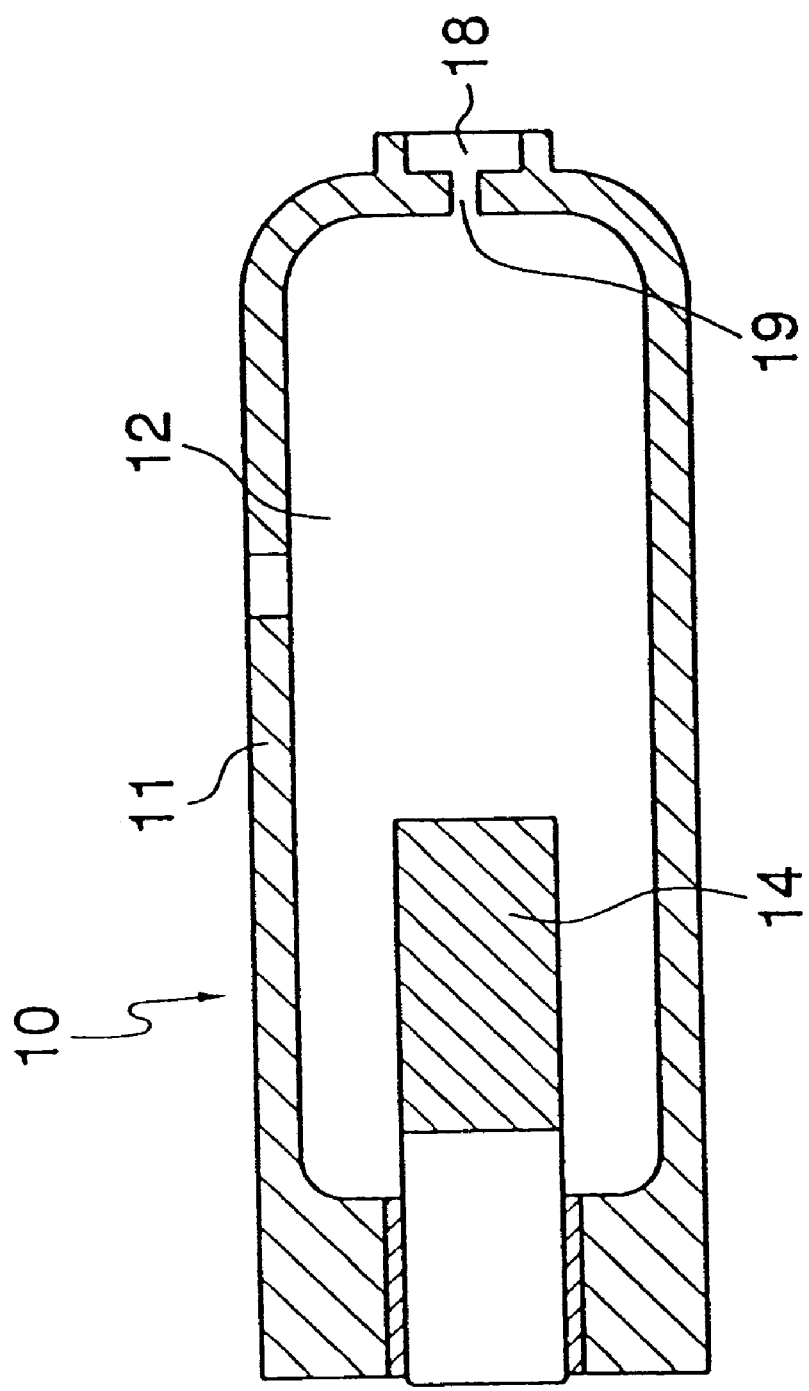
FIG. 4 is a sectional side view of a fourth embodiment of the high thermal efficiency inflator of the invention.

This effect may also be observed with frangible or combustible holders when the granules of pyrotechnic material are more tightly packed, but is best observed where the pyrotechnic material is in the form of an extruded microporous stick, as shown in FIG. 4, which also illustrates housing 11, defining volume 12, and seal 18. As the packing pressure of the granules of pyrotechnic material is increased, the delay between ignition of individual granules decreases, and the entire mass of pyrotechnic materials burns more rapidly. Where the pyrotechnic material is in the form of an extruded microporous stick, the entire mass of pyrotechnic material burns extremely rapidly because there is no spacing between granules to produce an ignition delay. As a result the granules of pyrotechnic material do not travel far through the pressurized gas during combustion, and that portion of the gas nearest the pyrotechnic material is heated to a significantly greater extent than the remainder of the gas, producing a significantly higher peak temperature and pressure in the heated portion of the gas than is observed in the rest of the gas, and higher temperature and pressure gradients. However, even though the peak pressure is significantly higher in this embodiment of the high thermal efficiency inflator, a high thermal efficiency inflator using a microporous stick of pyrotechnic material has a thermal efficiency that is significantly higher than that of prior art hybrid inflators. Where the outer surface of a prior art hybrid inflator may have an increase in temperature of over 100° F., the temperature increase in the housing of a high thermal efficiency inflator is typically no more than about 10° to about 12° F., and is often less than about 7° F. This clearly demonstrates that substantially all of the heat generated by the combustion of the pyrotechnic material goes into the inflation gas.

The internal dimensions and the amount of pyrotechnic material are also important factors in determining the thermal efficiency. Clearly, if a burning particle of pyrotechnic material contacts the inner surface of the housing, heat will be transferred to the housing, decreasing the amount of heat available to heat the gas, and, thus, decreasing the thermal efficiency of the high thermal efficiency inflator. Therefore, for a given amount of pyrotechnic material, there is a minimum allowable internal diameter or cross section for the housing. For example, about 80 g of the preferred pyrotechnic material described above in a 1.5 inch internal diameter housing, having a length of about 3.5 inches and a volume of 6 cubic inches, will burn completely without contacting the inner surface of the housing. In such a high thermal efficiency inflator, the outer surface temperature of the housing increases by only about 10° to 12° F. when the inflator functions, clearly demonstrating that little heat energy is absorbed by the housing during operation, resulting in the high thermal efficiency for the inflator. However, the outer surface of a similar inflator having the same volume and the same amount of pyrotechnic material, but a diameter of only 0.7 inch will have a change in temperature of over 80° F. This is because the distance available for the granules of pyrotechnic material to travel is too small for the granules to burn completely before contacting the inner surface, as a result, burning granules of pyrotechnic material contact the inner surface of such an inflator, transferring heat to the housing the rather than the gas.

It is possible to calculate the approximate distance that the granules will travel during combustion using the equation $$d = \frac{1}{2} at^2$$

where d is the distance the granule travels while under an acceleration, a, for a time, t. The acceleration of a granule will be equal to the net force acting on the granule (i.e., the net pressure on the granule multiplied by the effective cross sectional area of the particle) divided by the mass of the granule. As will be understood by one of skill in the art, the net pressure, is the difference between the pressure forcing the granule to move through the gas, which is caused by the release of heat and gaseous combustion products, and the drag on the granule as it moves through the pressurized gas. Assuming a net pressure of 10,000 psi on granules that have an effective cross section of about 0.0001 square inch (about 0.0006 square cm), have a total mass of about 9.25 g, and a combustion time of 0.01 seconds (10 ms), the distance traveled by the granules will be about 0.9 inches (2.4 cm). Similarly, where the combustion time of the granules is within the preferred range of 2 to 5 ms, the distance traveled will be about 0.04 in (0.1 cm) to about 0.24 in (0.6 cm).

The volume of the high thermal efficiency inflator is small when compared to prior art inflators. For example, for use with an inflatable seat belt, the required volume of the inflator of the invention is no more than two cubic inches, which is considerably smaller than prior art inflators that require a volume of at least about 10 cubic inches to produce the same amount of gas due to the thermal inefficiencies inherent in their construction.

Because of the high pressure and small volume of the gas and the short burn time of the pyrotechnic material, the inflator of the invention is able to respond almost instantaneously when production of gas is necessary, such as when the inflation of an inflatable restraint device is required during a collision involving a vehicle. In particular, the high thermal efficiency inflator of the invention typically requires no more than about ten milliseconds ("ms") to provide sufficient inflation gas to inflate an inflatable restraint device, such as the inflatable portion of an inflatable belt or a side air bag, after being triggered. In contrast, a typical prior art inflator normally requires 40 to 50 ms. The relatively small amount of pyrotechnic material used in the inflator also minimizes the amount of pyrotechnic byproducts produced during operation of the inflator.

Moreover, because all of the components of the high thermal efficiency inflator are contained within a small volume, the high thermal efficiency inflator may be positioned within the inflatable or in such a manner that the inflation gas flows from the high thermal efficiency inflator through a short opening or conduit directly into the inflatable restraint device. As a result, the total volume into which the inflation gas must flow is significantly smaller than that required with prior art inflators. This reduces the amount of inflation gas required to inflate the belt, further reducing the volume required for the high thermal efficiency inflator, and enabling the high thermal efficiency inflator to inflate an inflatable object, such as an inflatable restraint device, almost instantaneously when triggered.

The overall time variation in the function time of the high thermal efficiency inflator of the invention with temperature is virtually insignificant compared to prior art inflators, even when subjected to a variation in temperature over a range of from −65° to +175° F. at ignition. This is due, at least in part, to the normally short burning time of the pyrotechnic material. For example, if the 20 percent variation in the burning time of prior art inflators is assumed for the high thermal efficiency inflator of the invention, the temperature range discussed above would result in a variation in a 2 to 5 ms burning time of only 0.4 to 1 ms, and a variation of no more than 0.2 ms where the burning time is less than 1 ms. In contrast, in a prior art inflator having a 40 to 50 ms function time, the same variation in temperature results in a variation of from about 8 to about 10 ms. As a result, the high thermal efficiency inflator of the invention provides significantly more consistent performance and significantly greater protection than that provided by prior art inflators.

As discussed above, in the high thermal efficiency inflator of the present invention, at least about 10 percent, preferably from about 10 to about 80 percent, and, most preferably, from about 40 to about 60 percent, of the inflation gas is typically produced from the combustion of the pyrotechnic material with the remainder produced by the expansion of the pressurized gas, and, thus, the high thermal efficiency inflator of the invention may be referred to as a hybrid inflator. However, as one of skill in the art will readily understand, the amount of gas generated by the pyrotechnic material relative to the amount of pressurized gas and the expansion of the pressurized gas can be varied to a large extent by varying inflator parameters, such as the type and form of pyrotechnic material and the pressure of the gas, to meet the requirements of the intended application. In particular, the design variables for a particular inflator having a thermal efficiency of at least 95 percent include: the size, shape and thickness of the inflator housing, which is configured to reduce or eliminate the number of burning particles that contact the interior wall of the housing, and the material used to form the housing and the interior surface of the housing and the thermal conductivity of the material; and the amount and type of particle pyrotechnic material, the amount of particle compaction, and the amount of combustion product produced during combustion.

The high thermal efficiency inflator of the invention operates as follows: an ignitor, typically a pyrotechnic squib, initiates combustion of the pyrotechnic material within the inflator, which contains a stored, pressurized, chemically inert gas, releasing heat and gaseous combustion products into the stored gas, thereby increasing the pressure of the gas. The heat generated from the combustion of the pyrotechnic material is transferred directly and thermally, i.e., by molecular collisions, to the molecules of the gas in the housing without substantial contact with the housing or any other portion of the high thermal efficiency inflator other than the gas because the burning portions of the pyrotechnic material are substantially completely consumed before contacting the inner surface of the housing. The maximum pressure attained by the inert gas on combustion of the pyrotechnic material may be as high as about 60,000 psi, e.g., where the pyrotechnic material is confined within a holder or in the form of a solid extruded stick, such that the burning pyrotechnic material contacts only a portion of the gas in the housing. However, in the preferred embodiment described above, where the granules of pyrotechnic material are not confined after at least a portion of the container ruptures or burns, the maximum average pressure is typically on the order of 16,000 psi. However, if a different pressure is required for a specific application, the inflator may be adapted to provide the required pressure by varying the size of the housing, the amount or type of pyrotechnic material, the initial pressure of the stored pressurized gas, or a combination thereof in a manner that would be well understood by one of ordinary skill in the art, and such adaptations that are within the spirit and scope of the present invention. The seal is selected to open at a pressure higher than the initial pressure of the pressurized inert gas, but less than the maximum pressure attained during operation of the inflator. This allows for the continued heating of the gas within the inflator by burning pyrotechnic material as inflation gas is released from the high thermal efficiency inflator. At the outlet aperture, the pressure of the gas mixture from the inflator is reduced to approximately half, and the gas temperature is reduced approximately ten percent.

The housing, the holder, the end plug, and the manifold all present low thermal conductivity surfaces to the heated gas, thereby causing essentially all of the liberated heat from the combustion of the pyrotechnic combustion to be utilized effectively only to heat and expand the gas. Furthermore, another reason the holder and the housing do not absorb any significant amount of the generated heat is because they are relatively thin, on the order of from about 0.020 inch (about 0.5 mm) to about 0.040 inch (about 1 mm), and also because the inflator does not contain a filter that would absorb a significant amount of the thermal energy from the gas as the gas passes through therethrough.

As discussed above, the pressurized gas in the housing is preferably an inert gas, such as argon, and is most preferably argon because of its low thermal conductivity. Moreover, the use of an inert gas substantially prevents any chemical reaction between the pyrotechnic material, or any byproducts or end products resulting from the combustion of such pyrotechnic material, and the gas. As a result, substantially all of the heat generated by the combustion of the pyrotechnic material is trapped within the molecules of the gas, raising the temperature of the gas, and increasing the pressure of the gas within the housing and against the seal. Because substantially all of the heat generated by the combustion of the pyrotechnic material is transferred to the gas, the inflator of the invention operates with a very high thermodynamic efficiency, allowing a minimum of pyrotechnic material to be used.

A still further reason that the housing and the holder do not absorb any significant amount of the generated heat is because they are exposed to high temperatures only for a relatively short period of time of approximately 10 ms or less. This is in contrast to existing inflators which function at such elevated temperatures for approximately 30 to 60 ms. During such relatively extended periods of time, heat is inevitably transferred to the members forming such inflators.

When the seal opens, the gas expands through the opening and the optional conduit. By eliminating the conduit, the heated inflation gas may be transferred directly through the opening to the object to be inflated. The area of the seal and the cross sectional areas of the opening and the conduit may be selected in a manner well known in the art to control the time for the opening of the seal and the flow of the gas through the opening and the conduit. The composition of the pyrotechnic material and the relative sizes of the different granules in such material also control the time within which the gas is heated within the holder. The composition accordingly controls the time for the gas to flow from the inflator.

Figure 5:
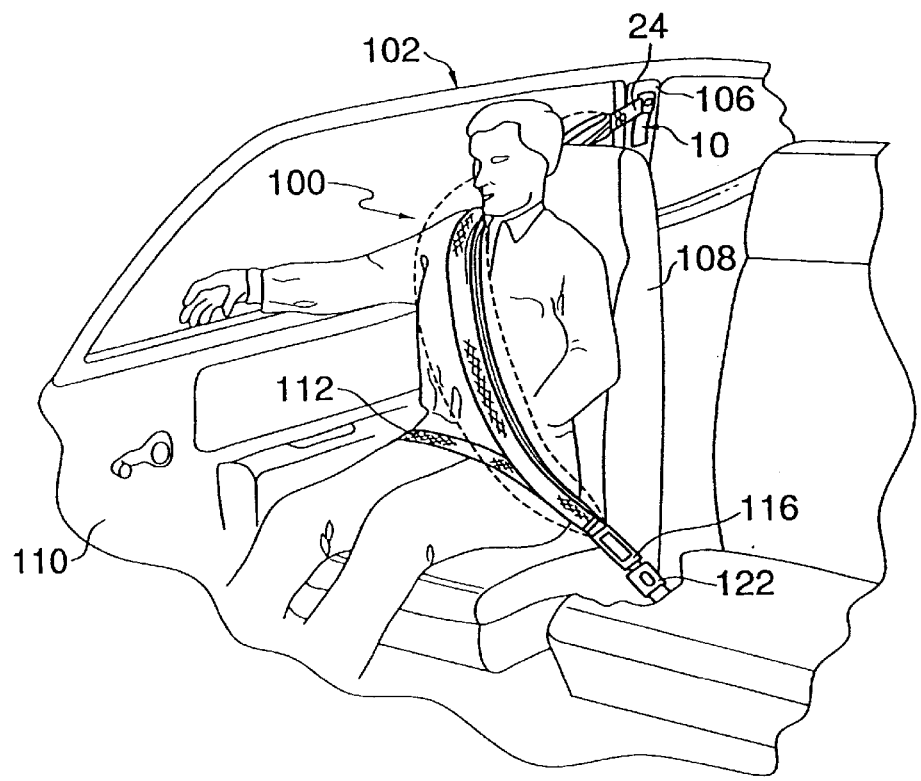
FIG. 5 is a partial sectional view of a vehicle having a unitary inflatable belt passive restraint system utilizing the high thermal efficiency inflator of the invention.
Figure 6:
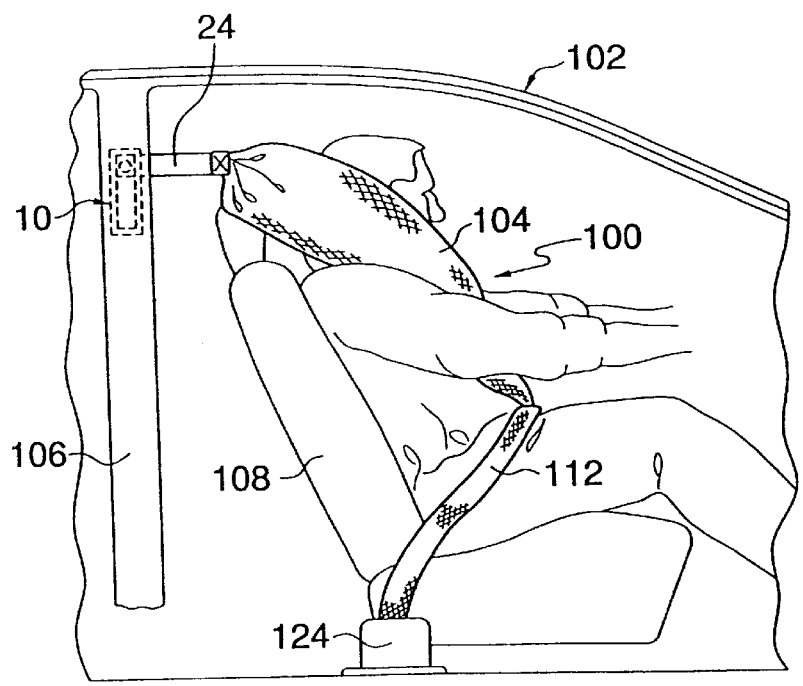
FIG. 6 is a sectional side view of the vehicle of FIG. 5 following inflation of the inflatable belt.

The high thermal efficiency inflator of the invention may be used to inflate a variety of different types of inflatable objects, such as air bags, but is particularly useful for inflating the inflatable belt portion of an inflatable seat belt, and may be included in a unitary belt generally indicated as 100 in FIGS. 5 and 6. Although the discussion in this specification is specifically directed to the inflatable portion of an inflatable seat belt, it will be appreciated that the inflator may be used with other types of inflatable members, including air bags, escape slides, and the like.

A unitary belt 100, adapted to be disposed in a vehicle generally indicated at 102, is illustrated in FIGS. 5 and 6. As used herein, the term "unitary" refers to the presence of only a single inflatable portion adjacent to the upper torso of the vehicle occupant and a non-inflatable lap belt portion. The inflatable portion is secured in a manner disclosed below to a non-inflatable lap portion. The unitary belt 100, which be may made from any suitable material, such as nylon, is adapted to protect an occupant in the event of a collision involving the vehicle 102. As illustrated in FIGS. 5 and 6, the inflatable belt portion 104 of the unitary belt 100 is attached at its upper end to a support structure such as a pillar 106, which is disposed at the side of the vehicle 102, adjacent to the occupant's chest, neck, and head, and above a seat 108 which holds the occupant. The pillar 106 is disposed to the rear of a vehicle door 110 through which the front seat occupant enters and exits. The support structure may alternately constitute any other suitable portion of the vehicle. For example, the support structure may constitute a flange on the inner surface of the roof portion when the inflatable belt portion 104 protects an occupant in the rear seat of the vehicle.

The inflator 10 shown in FIGS. 5 and 6 is preferably disposed at the upper end of the inflatable belt portion 104, and may be connected to the inflatable belt portion by means of a conduit 24, as described above. When the inflatable belt portion 104 is attached to the pillar 106, this attachment may be at the upper end of the pillar 106. The inflatable belt portion 104 may be preferably integrated between a decorative fascia with the standard shoulder belt adjustment mechanism enabling the upper position of the inflatable belt portion to fit most favorably the full range of occupants. The upper part of the inflatable belt portion 104 is preferably disposed above the occupant's shoulder and actually even above the occupant's neck and approximately at a horizontal level approximating the occupant's left cheek (if the occupant is the driver) or approximating the top of the occupant's head.

Figure 8:
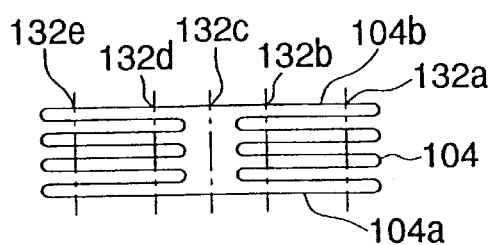
FIG. 8 is a sectional view through the belt shown in FIG. 5.

The inflatable belt portion 104 may be folded in a manner as shown in FIG. 8. As shown in FIG. 8, the inflatable belt portion 104 is provided with a pair of opposed wall portions 104a and 104b laterally displaced from each other. Each of the wall portions 104a and 104b extends in a zig-zag configuration from the lateral extremity of such wall portion to a position intermediate the lateral distance between the lateral extremities of such wall portions. This relationship enhances the speed at which the inflatable belt portion 104 can be inflated downwardly from the top of the inflatable belt portion. It also enhances the uniformity in the inflation downwardly of the inflatable belt portion 104.

Figure 11:
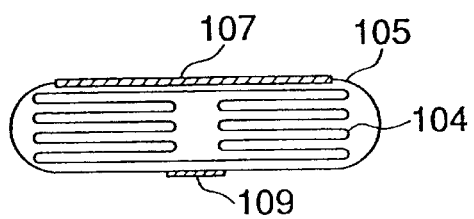
FIG. 11 is a sectional view of the inflatable belt portion and a cover enveloping the inflatable belt portion taken along line 11—11 of FIG. 7.

A cover 105 preferably envelopes the inflatable belt portion 104, as shown in FIG. 11. The cover 105 may be formed from a suitable material such as a polyester and may be provided with a color matching the decor of the interior of the vehicle 102. The cover 105 may be formed from a single piece of material attached at its opposite ends as by stitching 109. The stitching 109 may be disposed to face the chest of the occupant so that it is not visible to other occupants in the vehicle. The cover 105 becomes separated progressively from the inflatable belt portion 104 as the inflatable belt portion becomes inflated in a direction away from the inflator, which is generally located on or in the adjacent pillar 106, near the top of the belt, i.e., by the head and neck of the occupant. Thus, those belt portions are first to inflate, resulting in the outer sleeve ripping open from the top to the bottom, providing a controlled inflation of the inflatable belt portion in a direction away from the inflator. A stiffener 107 is disposed within the cover 105 against the inflatable belt portion 104 to prevent the inflatable belt portion 104 from twisting so that is in a flattened configuration prior to inflation.

The cover 105 provides certain advantages. It prevents the inflatable belt portion 104 from becoming degraded as from ultraviolet light, or due to chafing against the chest of the occupant. It additionally holds the inflatable belt portion 104 to a consistent initial minimal volume and holds the folds of the inflatable belt portion to provide a consistent unfolding of the belt portion. The stiffener 107 also assists in retaining the folds of the inflatable belt portion 104 to provide a consistent unfolding of the belt portion.

Figure 10:
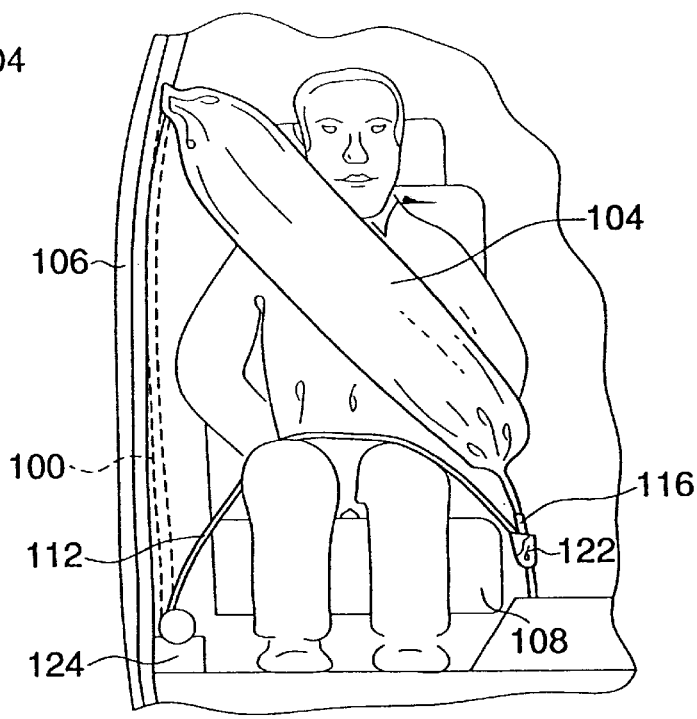
FIG. 10 is a frontal view of a vehicle occupant following inflation of the belt.

As shown in FIG. 10, the inflatable belt portion 104 extends diagonally, i.e., at a transverse angle, downwardly to a position near, but above, the occupant's lap at the inner or inboard side of the occupant's seat 108. In this diagonal or transverse configuration, the inflatable belt portion 104 crosses the occupant's chest. At its lower end, the inflatable belt portion 104 is suitably connected to a standard seat belt webbing material, such as nylon, which forms a lap belt portion 112. The construction of the lap belt portion 112 may correspond to the construction of the lap belts now in use. The inflatable belt portion 104 and the lap belt portion 112 may be considered to form a unitary belt.

Figure 7:
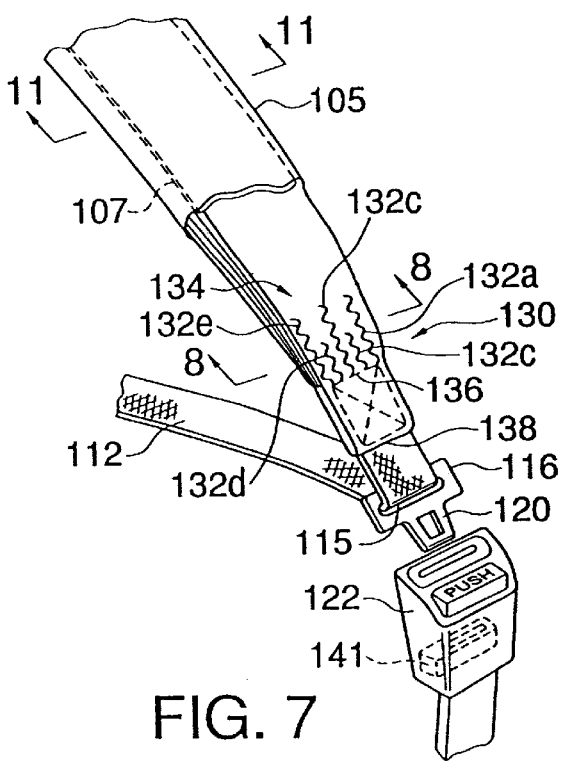
FIG. 7 illustrates the attachment of the inflatable belt portion and the lap belt portion of a the belt of FIGS. 5 and 6.
Figure 9:
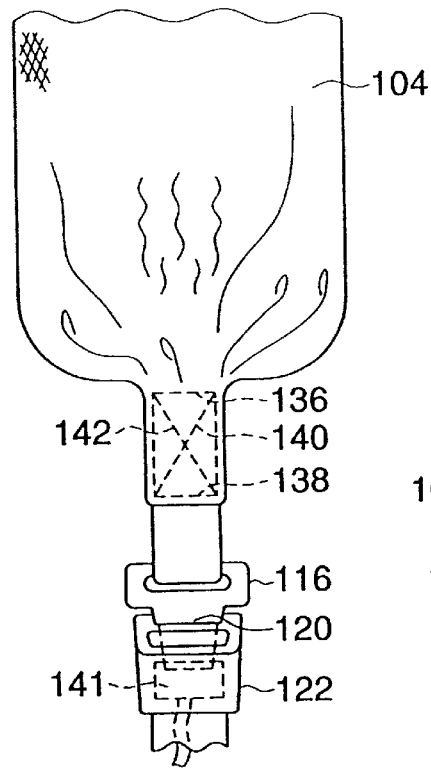
FIG. 9 illustrates the attachment of the inflatable belt portion and the lap belt portion of a unitary belt following inflation of the belt.

At a position near, but above, the occupant's lap, the lap belt portion 112 extends through a D-ring coupling member 116, as shown in FIGS. 7 and 9. A D-ring coupling member such as the D-ring coupling member 116 is well known in the art. The D-ring coupling member 116 has an opening 115 (FIG. 7) through which the lap belt portion 112 extends to change the direction of the lap belt portion 112 from a downward and transverse direction to substantially a horizontal direction (FIG. 10) in which the lap belt portion extends across the occupant's lap. At its inner end, the lap belt portion 112 is attached to the D-ring coupling member 116 (FIG. 5), which is removably coupled to a retainer 122 in the vehicle. The construction of the D-ring coupling member 116 and the retainer 122 is well known in the art for use in vehicles such as automobiles now on the market.

The inflatable belt portion 104 becomes inflated downwardly from the top of the belt when the inflator 10 is actuated. This is advantageous because it is desirable to exclude the mounting of the inflator 10 in undesirable locations such as the buckle and retractor locations due to their attendant gas and electrical connection deficiencies. Furthermore, the inflation of the inflatable belt portion 104 downwardly from the top of the inflatable belt portion facilitates protection initially of the head, neck and chest of the occupant. This results from the fact that an injury to the occupant's head, neck and chest can be life-ending but an injury to the occupant's lower extremities such as the occupant's knees and ankles is generally at worst crippling but not life-ending. Furthermore, in the case of a side impact of the vehicle 102, the time available for interspacing the protective cushion between the head and the interior of the side of the vehicle in a collision against the side of the vehicle is relatively short (e.g. 10–15 milliseconds). The downward inflation of the inflatable belt portion 104 from the top of the inflatable belt portion is particularly beneficial in such situations.

As will be seen from FIG. 6, the inflatable belt portion 104, when inflated, protects the occupant's neck and head. This controls the occupant's head motion by providing an inflated cushion which supports the occupant's head from beneath the chin and prevents the occupant's head from rotating violently in a forward direction. When the occupant's head rotates violently forward, as in the prior art, accompanied by a forward movement of the occupant's chest, the occupant's head may impinge against the dashboard or instrument-panel or steering wheel (when the occupant is in a front seat) unless adequate restraint against this movement is provided as in this invention. Furthermore, the occupant's neck may be severely strained, as in the prior art, as a result of the violent jerk imparted downwardly to the neck at the time of the collision. It will be appreciated that the occupant's chest is also protected by the inflatable belt portion of this invention. When the occupant is sitting in a rear seat, the occupant's neck and head are protected in this manner by the inflatable belt portion of this invention from moving against the rear of the front seat.

When the unitary belt 100 becomes inflated during a collision, the inflatable belt portion 104 expands and shortens, drawing the webbing portion of the lap belt portion 112 through the D-ring portion of the coupling member 116 when the coupling member is coupled to the retainer 122, tightening the lap belt portion 112 of the seat belt against the occupant's lap. This tightening of the lap belt portion 112 significantly enhances the restraint of the occupant when compared to conventional seat belts and prior art inflatable seat belts. In particular, the tightening of the lap belt portion 112 prevents the occupant from sliding under the seat belt, i.e., "submarining", into a portion of the interior of the vehicle during a collision, thus protecting against injury to the occupant's knees and lower extremities.

As shown in FIGS. 7 and 8, the inflatable belt portion 104 is relatively narrow before inflation. This results from the zig-zag configuration of each of the wall portions 104a and 104b from the lateral extremity of such wall portion to a position intermediate the wall portions. However, when the inflatable belt portion 104 becomes inflated, it expands so that the lateral distance between the wall portions 104a and 104b becomes considerably increased. This is best seen in FIGS. 9 and 10. This is advantageous since the unit force imposed upon the occupant's body at any position on the chest, neck and head is considerably reduced by the significant increase in the area of contact of the inflatable belt portion 104.

The lap belt portion 112 is adapted to be coupled to a retractor 124 fixedly disposed in the vehicle near the floor of the vehicle, as shown in FIGS. 6 and 10. The retractor 124 may be constructed in a conventional manner well known in the art to dispose (e.g. wind) the lap belt portion 112 on the retractor or allow the unwinding of the lap belt portion from the retractor. Suitable retractors are used with lap belts in vehicles now on the market. For example, the retractor 124 may constitute a Webbing Velocity Sensitive Retractor (Part No. 501580-4031) manufactured and sold by Am-Safe of Phoenix, Ariz.

The retractor 124 prevents the lap belt portion 112 from being extended upon the occurrence of a collision involving the vehicle 102. Since the lap belt portion 112 cannot be extended at such a time, the inflation of the inflatable belt portion 104 produces a tightening of the lap belt portion 112 against the lap of the occupant. At the same time, the inflatable belt portion 104 becomes disposed adjacent to the occupant's head, neck and chest to substantially restrain movement of these portions of the occupant's body.

When the coupling member 116 (FIGS. 3 and 5) is detached from the retainer 122 in a manner well known in the art, the retractor 124 causes the lap belt portion 104 to become disposed (e.g. wound) on the retractor. As a result, the inflatable belt portion 104 becomes disposed downwardly to a position adjacent, but to the rear of, the seat 108. This is shown in broken lines in FIG. 10 and in solid lines in FIG. 6. In the instance where the upper end of the inflatable belt portion 104 is attached to the pillar 106, the occupant is able to enter and exit the vehicle through the front door without any obstruction from any portion of the inflatable belt 104 since the pillar is to the rear of the front door.

As can seen, the inflatable belt assembly 100 is advantageous because it can be retrofitted in a vehicle without having to adjust any of the components or subassemblies in the vehicle. The unitary belt 100 can be provided for the occupant of the driver's seat, the occupant of the other front seat and the occupants in the rear seats. The unitary belt 100 is provided as an integral assembly in each of these seats, in part because the inflator 10 for inflating the inflatable belt portion 104 is disposed in juxtaposition to such inflatable belt portion.

As will be appreciated from the above discussion, the inflatable belt portion 104 becomes inflated almost instantaneously after the occurrence of a collision involving the vehicle. As the inflation reaches the bottom of the inflatable belt portion 104, it exerts a large stress at the position of thickness discontinuity between the relatively thin section of the inflatable belt portion 104 and the thicker portion of the webbing of the standard seat belt construction as represented by the lap belt portion 112. This webbing constitutes the material of the lap belt portion 112. The position of the thickness discontinuity is at the position where the inflatable belt portion 112 is attached to the lap belt portion 112.

The large stress at the position of the thickness discontinuity between the inflatable belt portion 104 and the lap belt portion 112 would tend to tear the thin material of the inflatable belt portion 104 and separate the inflatable belt portion 104 from the lap belt portion 112 if measures were not provided to prevent this from occurring. If the inflatable belt portion 104 became fully separated from the inflatable belt portion 112, the effects of inflating the inflatable belt portion 104 would be lost from the standpoint of protecting the occupant.

FIGS. 7, 8, and 9 show a stitching arrangement generally indicated at 130 for resolving the problem discussed in the previous paragraph. The stitching arrangement includes pluralities 132a, 132b, 132c, 132d and 132e of stitches 134. The stitches 134 in each of the pluralities 132a, 132b, 132c, 132d and 132e are arranged in a saw-tooth or zig-zag pattern in which the stitches in such plurality extend along the overlapping lengths of the belt portions 104 and 112 and in which alternate ones of the pluralities 132a, 132b, 132c, 132d and 132e of the stitches 134 have first lateral positions and the other ones of the pluralities of the stitches have lateral positions different from the first lateral positions. The pluralities 132a, 132b, 132c, 132d and 132e of the stitches 134 are displaced laterally from one another. Preferably each of the pluralities of stitches 132a, 132b, 132c, 132d and 132e is equally spaced in the lateral direction from the adjacent pluralities of stitches.

As best seen in FIG. 7, the pluralities 132a, 132c and 132e of the stitches 134 have a greater length than the pluralities 132b and 132d of the stitches 134. The pluralities 132b and 132d of the stitches 134 are preferably disposed respectively between the pluralities 132a and 132c of the stitches 134 and between the pluralities 132c and 132e of the stitches 134. This arrangement is provided primarily to reduce any sudden rise in stress as the stress loads are transitioned from the thin material of the inflatable belt portion 104 to the thicker webbing of the lap belt portion 112. It will be appreciated that the pluralities 132a, 132b, 132c, 132d and 132e of the stitches 134 may have the same or variable lengths without affecting the scope of the invention.

At a position removed in the inflatable belt 104 from the pluralities 132a, 132b, 132c, 132d and 132e of the stitches 134, additional stitches 136 and 138 (FIGS. 8 and 9) are disposed laterally across the widths of the overlapping inflatable belt portion 104 and the lap belt portion 112 at spaced positions along the overlapping lengths of the inflatable belt portion and the lap belt portion. Additional stitches extend diagonally from each lateral edge of the stitches 136 to the other lateral edge of the stitches 138 to define a criss-cross pattern. Such diagonal stitches are indicated at 140 and 142. These stitches serve to transmit the loads carried by one lateral edge of the inflatable belt portion 104 along the lateral dimensions of the inflatable belt portion 104 and the lap belt portion 112 to the other lateral edge of the inflatable belt portion.

When the inflatable belt portion 104 becomes inflated downwardly from the upper position of such belt portion, the force produced on the thin inflatable cloth constituting the inflatable belt portion 104 at the bottom end of such inflatable belt portion acts upon progressive ones of the stitches 134 in each of the pluralities 132a, 132b, 132c, 132d and 132e. This action loads each stitch progressively to the point of separation and thereby provides for a separation of such stitch. This may be illustratively seen in FIG. 7.

As the thin cloth at the lower end of the inflatable belt portion 104 becomes inflated and separated at the progressive ones of the stitches 134 in each of the pluralities 132A, 132b, 132c, 132d and 132e, the force is attenuated by the-energy absorption of the breaking threads such that the thin cloth is protected and remains fully intact and transmits the belt loads from the inflatable belt portion 104 to the lap belt portion 112. The zig-zag stitches are preferably at angles approximately 45° relative to the path of the inflatable belt portion 104 and are composed of threads whose breakage strength is such that every thread breaks sequentially, one after the other, so as to establish a maximum limit on the cloth load. When the inflatable belt portion 104 becomes inflated, it produces a large stress on the thin cloth defining the inflatable belt portion 104. This stress is absorbed by the separation of the inflatable belt portion 104 and the lap belt portion 112 at some of the stitches 134 in the pluralities 132a, 132b, 132c, 132d and 132e. Others of the stitches 134 may remain intact as do the stitches 136, 138, 140 and 142. In this way, the inflatable belt portion 104 and the lap belt portion 112 remain attached without any tearing of the cloth defining the inflatable belt portion 104.

The high thermal efficiency inflator of the invention and passive restraint systems comprising the high thermal efficiency inflator of the invention display several advantages over the prior art. For example, positioning the high thermal efficiency inflator adjacent to the inflatable belt portion 104 helps to minimize the time required for the inflatable belt portion 104 to inflate. This also helps to minimize the size and weight of the inflator 10 by reducing the amount of inflation gas required. However, most of the size and weight savings of the high thermal efficiency inflator of the invention are a result of its high thermal efficiency of at least about 90 percent and, preferably, at least about 95 percent, and, most preferably, at least about 98 percent. In particular, since at least about 90 percent of the heat generated by the combustion of the pyrotechnic material is transferred to the inflation gas, rather than the housing, the volume of inflation gas provided at a given pressure is maximized, minimizing the amount of pyrotechnic material and pressurized gas required to produce the inflation gas. As a result, for an equivalent amount of inflation gas, the a high thermal efficiency inflator of the invention will be substantially smaller and lighter than prior art inflators, and will also remain far cooler during operation.

EXAMPLES

The following non-limiting examples are merely illustrative of the preferred embodiments of the present invention, and are not to be construed as limiting the invention, the scope of which is defined by the appended claims.

Example 1

A cylindrical aluminum inflator housing of the type shown in FIG. 1 was assembled. The inflator had a diameter of 1.5 inches and a length of 4 inches, and contained a pyrotechnic material holder having a 0.75 inch diameter and a 1.5 inch length. Thickness of the inflator housing was 0.030 inch and the thickness of the holder was 0.010 inch. The housing was pressurized to 6,000 psi with argon. The holder contained 9 grams of a pyrotechnic material comprising 60 weight percent ammonium nitrate, 36 weight percent RDX, and 4 weight percent cellulose acetate binder. The particles of the pyrotechnic material were compacted to a porosity of 60 percent.

The inflator was connected to an inflatable seat belt, and the pyrotechnic material was ignited. The peak pressure in the housing after ignition was 28,000 psi, inflating the belt inflated to a pressure of about 15 psi. The percent of heat energy generated by the combusted material which heated the housing was about three percent, as determined from the increase in temperature of the inflator housing and the temperature, volume, and pressure of the inflation gas.

Example 2

Five (5) samples of the pyrotechnic material used in example 1, having particles compacted to varying degrees, were each placed in separate cylindrical inflators in accordance with the present invention, which varied in diameter, length and wall thickness. Each inflator was functioned, and the temperature of the inflators walls was immediately measured. The amount of heat generated by the combustion of the pyrotechnic material in each inflator was measured, and compared to the amount of heat transferred to each inflator. The data showed that each inflator had a thermal efficiency of at least 90 percent.

To summarize, the superior performance of the high efficiency inflator of the invention is provided, at least in part, by the high thermal efficiency of the inflator. Factors that contribute to the high thermal efficiency include a propellant that completes combustion without contacting heat absorbing surfaces within the high efficiency inflator, substantially reducing parasitic heat loss to the walls of the pressure vessel, i.e., the housing of the high efficiency inflator. Preferably, the interior surface of the pressure vessel has a smooth, or, more preferably, has a mirrored inner surface to reflect heat radiation away from the interior surface, further reducing heat loss to the housing.

Typically, with a granular propellant, the flame spread and ignition transfer of the propellant can be controlled by, e.g., adjusting the packing density of the propellant, so that combustion of the propellant is substantially complete before any burning granules are propelled against the interior surface of the housing. By substantially eliminating contact of the interior surface of the housing by burning granules, heating of the housing is substantially eliminated. Instead, substantially all of the heat released by the combustion of the propellant directly heats the pressurized gas stored within the housing.

Preferably, the propellant granules are stored along the center line or central core of the high efficiency inflator at a distance from the interior surface of the housing sufficient to allow the complete combustion of the propellant, so that the combustion of the propellant granules occurs in the space between the central core, where the propellant granules are stored, and the interior surface of the housing without contacting the interior surface.

Upon ignition of the stored propellant within the central core, heat and gaseous combustion products are released, increasing the local pressure in the central core.

This increase in pressure propels the propellant granules away from the central core, through the gas, and towards the interior surface of the housing.

The increased local pressure moves through the interior of the high efficiency inflator as an expanding gas front, exerting a force on each of the granules. Each granule responds to the force acting upon it by accelerating away from the increased pressure in the central core towards the interior wall at a rate determined by the mass of the particle, its effective cross sectional area, and the net force acting on the granule, i.e., the sum of all forces acting on the granule, which is approximately the difference in pressure on opposite sides of the granule. However, because the burn time of the propellant is sufficiently short, and the pressure of the gas is sufficiently high, combustion of the propellant is substantially complete before virtually any of the propellant granules moving through the gas are able to impact the interior wall of the housing. Therefore, substantially all of the heat produced from the combustion of the propellant is transferred to the gas, heating the gas with high efficiency.

In a typical inflator of the invention, the gas is stored at a pressure of at least about 4,000 psi, preferably from about 5,000 to about 7,000 psi, more preferably about 6,000 psi. Upon ignition of the propellant, heat and gaseous combustion products are released, increasing the pressure within the housing. At a pressure of about 7,000 to about 11,000, preferably from about 8,000 to about 10,000 psi, most preferably, about 9,000 psi, the seal opens, allowing gas to escape from the inflator. This occurs in less than about 1 ms, preferably, less than about 0.5 ms, a period of time significantly shorter than the burn time of the propellant, which is preferably on the order of about 5 ms. Therefore, even though gas begins to exit the inflator to inflate the inflatable object, the pressure continues to increase within the high efficiency inflator until substantially all of the propellant has completed burning. Upon completion of the combustion of the propellant, the pressure within the high efficiency inflator begins to decrease, and continues to decrease as the inflatable inflates.

In a typical high efficiency inflator of the invention, the granules of propellant have a size of about 20 mesh and a specific gravity of about 1.7. Because the pressure of the gas within the high efficiency inflator is so high, typically greater than about 4,000 psi initially, and, possibly, achieving average pressures greater than about 20,000 psi during the combustion process, the high pressure of the pressurized gas results in a very high drag upon each granule. As a result, the effective velocity achievement of each granule is only the order of 0.4 percent.

The increase in pressure at the core of the high efficiency inflator and the release of gaseous combustion products from the combustion of each granule causes the granules to fly through the pressurized gas. Although the average pressure within the high efficiency inflator may be on the order of 20,000 psi, the local pressure at the core of the high efficiency inflator may be on the order of about 50,000 psi, causing the granule to move form the center of the high efficiency inflator towards the interior wall of the housing. However, because combustion can occur on all sides of each granule, a granule typically does not fly in a straight line, but, instead, follows an irregular path.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

What is claimed:

1. A high thermal efficiency inflator having a thermal efficiency of at least about 90 percent, the high thermal efficiency inflator comprising:

a housing having an inner surface, and defining an interior volume, the housing containing a pressurized gas at a first pressure in the interior volume;

a pyrotechnic material for producing heat upon combustion, having a burn rate that is accelerated at the first pressure in comparison to the burn rate at a pressure of one atmosphere, the pyrotechnic material stored within the interior volume of the housing at a distance from the inner surface of the housing, wherein the stored pyrotechnic material is subjected to the first pressure of the pressurized gas, wherein the pyrotechnic material in and of itself is free of thermal contact with the housing before the combustion thereof;

an ignitor for initiating combustion of the pyrotechnic material upon receipt of an initiation signal; and means for maintaining the pressurized gas at the first pressure within the interior volume, and to open when the gas attains a predetermined second, higher pressure upon heating of the pressurized gas by combustion of the pyrotechnic material to allow an inflation gas to pass from the housing; wherein the pyrotechnic material is present in an amount sufficient to produce at least about 10 mole percent of the inflation gas, and the pressurized gas is present in an amount sufficient to produce up to about 90 mole percent of the inflation gas; and wherein the first pressure of the pressurized gas is sufficiently high to produce an aerodynamic drag on burning pyrotechnic material passing through the pressurized gas, thereby slowing the burning pyrotechnic material; wherein the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion of the pyrotechnic material to be transferred to the inflation gas, so that no more than about 10 percent of the heat is transferred to the housing, resulting in a thermal efficiency of the high thermal efficiency inflator of at least about 90 percent.

2. The high thermal efficiency inflator of claim 1, wherein the pyrotechnic material is located within the housing in a frangible container that ruptures upon combustion of the pyrotechnic material.

3. The high thermal efficiency inflator of claim 1, wherein the pyrotechnic material is located within the housing in a container formed from a combustible material that burns upon combustion of the pyrotechnic material.

4. The high thermal efficiency inflator of claim 3, wherein the combustible material is deep drawn steel, aluminum or a combination of palladium and aluminum.

5. The high thermal efficiency inflator of claim 1, wherein the pyrotechnic material is located within the housing in a container comprising a plug formed from a frangible or combustible material, such that, upon combustion of the pyrotechnic material, the plug ruptures or burns, allowing particles of burning pyrotechnic material to pass through the pressurized gas, transferring heat to the pressurized gas.

6. The high thermal efficiency inflator of claim 5, wherein the container defines a plurality of apertures or pores.

7. The high thermal efficiency inflator of claim 1, wherein the pyrotechnic material is located within the housing in a porous container defining a plurality of apertures or pores, wherein the apertures or pores are of a sufficient size and a sufficient number to allow combusting particles to pass into the interior volume from the porous container through the apertures or pores, thereby heating the pressurized gas.

8. The high thermal efficiency inflator of claim 1, wherein the pyrotechnic material is stored within said housing in the form of an extruded stick of said material.

9. The high thermal efficiency inflator of claim 1, wherein the distance between the stored pyrotechnic material and the inner surface of the housing is at least about 0.25 inch.

10. The high thermal efficiency inflator of claim 9, wherein the distance between the stored pyrotechnic material and the inner surface of the housing is at least about 0.5 inch.

11. The high thermal efficiency inflator of claim 1, wherein the first pressure is at least about 4,000 psi.

12. The high thermal efficiency inflator of claim 11, wherein the first pressure is from about 5,000 to about 7,000 psi.

13. The high thermal efficiency inflator of claim 12, wherein the first pressure is about 6,000 psi.

14. The high thermal efficiency inflator of claim 1, wherein the inflation gas attains a peak operational pressure of from about 12,000 psi to about 20,000 psi.

15. The high thermal efficiency inflator of claim 14, wherein the peak operational pressure of the inflation gas is from about 15,000 psi to about 17,000 psi.

16. The high thermal efficiency inflator of claim 15, wherein the peak operational pressure of the inflation gas is about 16,000 psi.

17. The high thermal efficiency inflator of claim 1, wherein the second pressure is from about 7,000 to about 11,000 psi.

18. The high thermal efficiency inflator of claim 1, wherein the second pressure ranges from about 8,000 to about 10,000 psi.

19. The high thermal efficiency inflator of claim 1, wherein the pyrotechnic material is present in an amount sufficient to produce from about 40 to about 60 mole percent of the inflation gas.

20. The high thermal efficiency inflator of claim 1, wherein the pyrotechnic material is a microporous, solvent processed propellant.

21. The high thermal efficiency inflator of claim 20, wherein the pyrotechnic material has a porosity of at least about 20 percent.

22. The high thermal efficiency inflator of claim 20, wherein the pyrotechnic material comprises ammonium nitrate oxidizer and an energizer.

23. The high thermal efficiency inflator of claim 22, wherein the energizer comprises at least one of RDX, HMX, CL-20, TEX, NQ, NTO, TAGN, PETN, TATB, and TNAZ.

24. The high thermal efficiency inflator of claim 22, wherein the pyrotechnic material comprises ammonium nitrate, RDX, and a cellulose acetate binder.

25. The high thermal efficiency inflator of claim 24, wherein the pyrotechnic material comprises about 60 weight percent ammonium nitrate, about 36 weight percent RDX, and about 4 weight percent cellulose acetate binder, and has a burn rate of 20,000 m/s.

26. The high thermal efficiency inflator of claim 20, wherein the pyrotechnic material is in the form of an extruded stick, a fine powder, flakes, granules, or other particles.

27. The high thermal efficiency inflator of claim 1, wherein the ignitor is a pyrotechnic squib.

28. The high thermal efficiency inflator of claim 27, wherein the pyrotechnic squib comprises a pair of connector pins electrically connected by a bridge wire, coated with or in thermal contact with a first firing compound, wherein the first firing compound is subjected to the pressure of the pressurized gas.

29. The high thermal efficiency inflator of claim 1, wherein the pressurized gas is a chemically inert gas having a thermal conductivity of no more than about 250 W/cm·° C. at 25° C.

30. The high thermal efficiency inflator of claim 29, wherein the pressurized gas is argon, or a mixture containing argon.

31. The high thermal efficiency inflator of claim 1, wherein the housing is formed from a material having a thermal conductivity at 25° C. of less than about 1 Watts/cm·° C.

32. The high thermal efficiency inflator of claim 31, wherein at least a portion of the housing is formed from at least one material selected from the group consisting of low thermal conductivity metal, ceramic, epoxy, fiber glass, and nylon.

33. A high thermal efficiency inflator having a thermal efficiency of at least about 90 percent, the high thermal efficiency inflator comprising:

a housing, formed from a material having a thermal conductivity at 25° C. of less than about ½ Watts/cm·° C., having an inner surface, and defining an interior volume, the housing containing a chemically inert pressurized gas at a first pressure of at least about 4,000 psi in the interior volume;

a pyrotechnic material for producing heat upon combustion, having a burn rate that is accelerated at the first pressure in comparison to the burn rate at a pressure of 1 atmosphere, the pyrotechnic material stored within the interior volume of the housing at a distance from the inner surface of the housing, wherein the stored pyrotechnic material is subjected to the first pressure of the pressurized gas, and is substantially free of thermal contact with the housing;

an ignitor for initiating combustion of the pyrotechnic material upon receipt of an initiation signal; and means for maintaining the pressurized gas at the first pressure within the interior volume, and to open when the gas attains a predetermined second, higher pressure of at least about 8,000 lbs. per inch square upon heating of the pressurized gas by combustion of the pyrotechnic material to allow an inflation gas to pass from the housing; wherein the pyrotechnic material is present in an amount sufficient to produce at least about 10 mole percent of the inflation gas, and the pressurized gas is present in an amount sufficient to produce up to about 90 mole percent of the inflation gas; and wherein the first pressure of the pressurized gas is sufficiently high to produce an aerodynamic drag on burning pyrotechnic material passing through the pressurized gas, thereby slowing the burning pyrotechnic material; wherein the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion to be transferred to the inflation gas, so that no more than about 10 percent of the heat is transferred to the housing, resulting in a thermal efficiency of the high thermal efficiency inflator of at least about 90 percent, and an increase in temperature of the housing of no more than about 20° C. during functioning of the high thermal efficiency inflator.

34. A passive restraint system, which comprises:

an inflatable passive restraint in fluid communication with a high thermal efficiency inflator having a thermal efficiency of at least about 90 percent, the high thermal efficiency inflator comprising:

a housing having an inner surface, and defining an interior volume, the housing containing a pressurized gas at a first pressure in the interior volume;

a pyrotechnic material for producing heat upon combustion, having a burn rate that is accelerated at the first pressure in comparison to the burn rate at a pressure of 1 atmosphere, the pyrotechnic material stored within the interior volume of the housing at a distance from the inner surface of the housing, wherein the stored pyrotechnic material is subjected to the first pressure of the pressurized gas, wherein the pyrotechnic material in and of itself is free of thermal contact with the housing before the combustion thereof;

an ignitor for initiating combustion of the pyrotechnic material upon receipt of an initiation signal; and means for maintaining the pressurized gas at the first pressure within the interior volume, and to open when the gas attains a predetermined second, higher pressure upon heating of the pressurized gas by combustion of the pyrotechnic material to allow an inflation gas to pass from the housing; wherein the pyrotechnic material is present in an amount sufficient to produce at least about 10 mole percent of the inflation gas, and the pressurized gas is present in an amount sufficient to produce up to about 90 mole percent of the inflation gas; and wherein the first pressure of the pressurized gas is sufficiently high to produce an aerodynamic drag on burning pyrotechnic material passing through the pressurized gas, thereby slowing the burning pyrotechnic material; wherein the drag produced on the burning pyrotechnic material and the distance between the stored pyrotechnic material and the inner surface of the housing are sufficiently great that, upon combustion of the pyrotechnic material, contact between a sufficient amount of the burning pyrotechnic material and the inner surface of the housing is prevented to allow at least about 90 percent of the heat produced by the combustion to be transferred to the inflation gas, so that no more than about 10 percent of the heat is transferred to the housing, resulting in a thermal efficiency of the high thermal efficiency inflator of at least about 90 percent, and an increase in temperature of the housing of no more than about 20° C. during functioning of the high thermal efficiency inflator.

35. A method of inflating an inflatable object, the method comprising:

providing an inflatable object, having an interior volume in fluid communication with a high thermal efficiency inflator, having a thermal efficiency of at least about 90 percent, to provide an inflation gas to inflate the inflatable object, the high thermal efficiency inflator comprising:

a housing having an inner surface, and defining an interior volume, the housing containing a pressurized gas at a first pressure in the interior volume, wherein the pressurized gas is present in an amount sufficient to provide up to about 90 mole percent of the inflation gas;

a pyrotechnic material for producing heat upon combustion, having a burn rate that is accelerated at the first pressure in comparison to the burn rate at a pressure of 1 atmosphere, the pyrotechnic material stored within the interior volume of the housing at a distance from the inner surface of the housing, wherein the stored pyrotechnic material is subjected to the first pressure of the pressurized gas, wherein the pyrotechnic material in and of itself is free of thermal contact with the housing before the combustion thereof; and means for maintaining the pressurized gas at the first pressure within the interior volume, and to open when the gas attains a predetermined second, higher pressure upon heating of the pressurized gas by combustion of the pyrotechnic material to allow an inflation gas to pass from the housing;

initiating an ignitor in thermal contact with the pyrotechnic material, thereby initiating combustion of the pyrotechnic material, producing heat, and producing gaseous combustion products in an amount sufficient to provide at least about 10 mole percent of the inflation gas;

providing the pressurized gas at a first pressure sufficiently high to produce an aerodynamic drag on burning pyrotechnic material passing through the pressurized gas, thereby slowing the burning pyrotechnic material, such that the drag produced on the burning pyrotechnic material and the distance between the stored pyrotechnic material's location and the inner surface of the housing prevent contact between a sufficient amount of the burning pyrotechnic material and the inner surface of the housing, thereby transferring at least about 90 percent of the heat directly and thermally to the pressurized gas, increasing the pressure of the gas from the first pressure to at least the second, higher pressure, causing the means for maintaining the pressurized gas to open, allowing the gas to pass into the interior volume of the inflatable object, thereby inflating the object.

36. The method of claim 35, further comprising providing the pressurized gas at a first pressure sufficiently high such that the drag produced on the burning pyrotechnic material and the distance between the stored pyrotechnic material's location and the inner surface of the housing prevent the contact between at least 50 percent of the burning pyrotechnic material and the housing.

* * * * *